United States Patent
Brandl

(10) Patent No.: US 12,394,616 B2
(45) Date of Patent: *Aug. 19, 2025

(54) ION SHUTTING SYSTEM WITH COMPENSATION ELECTRODES FOR ION TRAP

(71) Applicant: Infineon Technologies Austria AG, Villach (AT)

(72) Inventor: Matthias Brandl, Kirchseeon (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

This patent is subject to a terminal disclaimer.

(21) Appl. No.: 18/598,491

(22) Filed: Mar. 7, 2024

(65) Prior Publication Data
US 2024/0213015 A1 Jun. 27, 2024

Related U.S. Application Data

(63) Continuation of application No. 17/813,809, filed on Jul. 20, 2022, now Pat. No. 11,978,619.

(51) Int. Cl.
H01J 49/42 (2006.01)

(52) U.S. Cl.
CPC ...... *H01J 49/4275* (2013.01); *H01J 49/4235* (2013.01)

(58) Field of Classification Search
CPC ............ H01J 49/4235; H01J 49/4275; H01J 49/0081; H01J 49/0031
USPC ....................................... 250/281, 282, 283
See application file for complete search history.

(56) References Cited

U.S. PATENT DOCUMENTS

| 11,978,619 B2 * | 5/2024 | Brandl ............... G21K 1/00 |
| 2005/0258364 A1 | 11/2005 | Whitehouse et al. |
| 2016/0025692 A1 | 1/2016 | Satake et al. |

OTHER PUBLICATIONS

Doret, C.S. et al., "Controlling Trapping Potentials and Stray Electric Fields in a Microfabricated Ion Trap Through Design and Compensation," New Journal of Physics 14, The open-access journal for physics, Jul. 6, 2012, 16 pages.
Stuart, J. et al., "Chip-Integrated Voltage Sources for Control of Trapped Ions," Phys. Rev. Applied 11, 0240120, 2019, 7 pages.

* cited by examiner

*Primary Examiner* — Nicole M Ippolito
(74) *Attorney, Agent, or Firm* — SLATER MATSIL, LLP

(57) ABSTRACT

An ion shuttling system includes a plurality of first electrodes connected to a system configured to selectively provide an ion movement control voltage to each electrode of the plurality of first electrodes, a voltage source configured to provide one or more compensation voltages, a plurality of compensation electrodes comprising a plurality of compensation electrode pairs, where each compensation electrode pair of the plurality of compensation electrode pairs is associated with one or more different first electrodes of the plurality of first electrodes, and a plurality of switches, where each switch of the plurality of switches is connected at a respective first node to a compensation electrode of the plurality of compensation electrodes and is configured to selectively connect the respective compensation electrode to the voltage source.

23 Claims, 13 Drawing Sheets

ION SHUTTING SYSTEM WITH COMPENSATION ELECTRODES FOR ION TRAP

This application is a continuation of U.S. application Ser. No. 17/813,809, filed on Jul. 20, 2022, which application is hereby incorporated herein by reference.

TECHNICAL FIELD

The present invention relates generally to a system and method for storing and moving ions in an ion trap, and, in particular embodiments, to a system and method for providing stray voltage field compensation in multidimensional ion routing system.

BACKGROUND

Generally, ion traps may be used trapped ion quantum computing, with ions used as qubits for computation, the excitation state of an electron indicating a logical value or logic state. Ions such as barium (Ba), magnesium (Mg), calcium (Ca), beryllium (Be), or the like, may be positively charged, and a single electron in the outer shall of the ion used as the logic element. Two or more ions may be entangled, as changing the state of one qubit causes the entangled qubits to change their state immediately, providing substantial speed and power savings over conventional computing. Additionally, ion traps may be used in atomic clocks, where the internal state of the ion is used as a frequency reference, for example for the definition of a second.

However, ion traps require a well-controlled environment, and precise handling of the ions. Generally, ions in an ion trap are trapped or controlled using a radio frequency (RF) field operating at around 200 volts, and 20 megahertz (MHz). Additionally, ions, like any quantum system, have limited coherence times, requiring rapid handling. However, trapped ions are sensitive to stray voltages that may be local or regional in an ion trap, and may, for example, be induced by photon interactions with dielectrics that generate surface charges.

SUMMARY

An embodiment apparatus includes a plurality of first electrodes connected to a system configured to selectively provide an ion movement control voltage to each electrode of the plurality of first electrodes, a voltage source configured to provide one or more compensation voltages, a plurality of compensation electrodes comprising a plurality of compensation electrode pairs, wherein each compensation electrode pair of the plurality of compensation electrode pairs is associated with one or more different first electrodes of the plurality of first electrodes, and a plurality of switches, wherein each switch of the plurality of switches is connected at a respective first node to a compensation electrode of the plurality of compensation electrodes and is configured to selectively connect the respective compensation electrode to the voltage source.

An embodiment apparatus includes one or more radio frequency (RF) electrodes connected to an RF generation system and configured to create an RF trapping point and to trap an ion, a plurality of first electrodes configured to control movement of an ion along a movement direction by generating an electrical field as a result of being provided with an ion movement control voltage, a voltage source configured to provide one or more compensation voltages, a plurality of compensation electrodes comprising a plurality of compensation electrode pairs, wherein each compensation electrode pair of the plurality of compensation electrode pairs is associated with one or more different first electrodes that are of the plurality of first electrodes and that is disposed between compensation electrodes of the associated compensation electrode pair, wherein each compensation electrode pair is configured to provide a compensation electrical field (E-Field) to an ion being shuttled by one or more associated first electrodes to shift an ion, which is affected by a stray voltage, toward the RF trapping point in response to compensation voltages provided to the compensation electrodes of the compensation electrode pair, a plurality of switches, wherein each switch of the plurality of switches is configured to selectively connect a respective compensation electrode of the plurality of compensation electrodes to the voltage source.

An embodiment method for using an embodiments system includes identifying one or more compensation electrodes from a plurality of compensation electrodes in an ion movement control system having the plurality of compensation electrodes and a plurality of first electrodes, determining a compensation voltage for the one or more compensation electrodes, controlling a voltage source to provide the compensation voltage, and providing the compensation voltage to the one or more compensation electrodes by connecting the one or more compensation electrodes to the voltage source while a first electrode of the plurality of first electrodes controls movement an ion.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
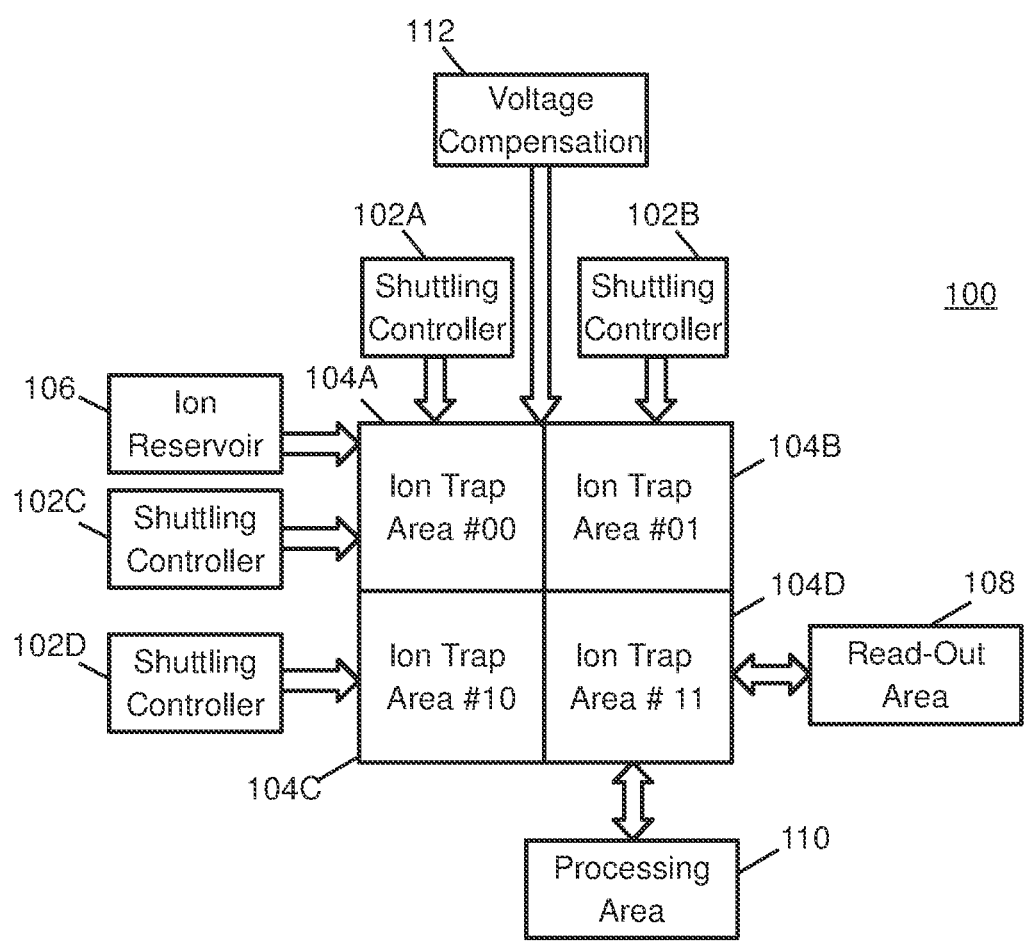
FIG. 1 is a logical diagram illustrating a ion trap system with a shuttling system according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Ion trapping is a promising candidate for quantum computing, atomic clocks, and other technologies dependent on isolating single ions. In Penning traps, the ions are confined via a magnetic field and an electrostatic potential. In Paul traps, the ions are confined via an RF-voltage and an electrostatic potential. In a trapped ion quantum computing system, electrostatic potentials are used to move ions between storage and processing locations in a process called ion shuttling. Similarly, electrostatic potentials are used in atomic clocks to trap and control an ion, with properties of the ion used to define the length of a second. In order to control these potentials, hundreds, or even thousands, of electrodes must be simultaneously controlled in order to provide the desired electrical field (E-field). Individualized control of the electrodes requires use of digital-to-analog converters (DACs). However, these systems may have stray fields, which may vary over time and depend on the position. Typically, as a result of the stray fields, the RF-trapping point or an RF field, called RF-null, does not perfectly align with the electrostatic or direct current (DC) trapping point. In order to overlap the RF and the electrostatic or DC trapping points, one needs at least 2 electrodes for compensation. Each compensation electrode is connected to a variable voltage source, e.g. a DAC.

A system for ion shuttling may use a limited number of DACs that are multiplexed to a large number of electrodes in a multidimensional array. The multidimensional ion shuttling system provides for shuttling of multiple ions in multiple different directions simultaneously using the same DACs. Thus, the cost and power requirements associated with a one-to-one DAC-to-electrode arrangement is reduced by using the same DACs to control multiple electrodes.

The potential for stray fields that are position dependent, and that slowly vary over time results in voltage fields at the respective electrodes being inconsistent with respect to the desired output voltage, as the stray fields interfere with the applied desired voltage. However, a limited number of compensation DACs may be used to provide a voltage to an electrostatically charged compensation electrode by selectively coupling the compensation DACs to the compensation electrodes to periodically electrostatically charge the compensation electrodes to a customized compensation voltage to compensate for the stray fields. This permits compensation for the stray fields are compensated without affecting the confining field. Periodically charging the compensation electrodes permits the DACs can be multiplexed for the periodic charging of the compensation electrodes because the same confinement voltages, with stray field compensation voltages, is necessary.

FIG. 1 is a logical diagram illustrating ion trap system 100 with an ion shuttling system according to some embodiments. The system 100 has one or more ion trap areas 104A-104D that including ion shuttling systems, and which are configured to shuttle ions between target areas such as an ion reservoir 106, ion read-out area 108, and other areas such as ion disposal areas (not shown), processing areas 110, and between the ion trap areas 104A-104D. The system 100 may also have one or more shuttling controllers 102A-102D electrically connected to the ion shuttling systems of the ion trap areas 104A-104D to control movement of the ions.

While the system 100 is illustrated with four ion trap areas 104A-104D and four shuttling controllers 102A-102D, with the ion trap areas 104A-104D in a symmetrical arrangement, the system 100 is not limited to such an arrangement. The shuttling controllers 102A-102D provide addressable voltage control of electrodes, and are, therefore, configured to control any number of cascaded ion trap areas 104A-104D, in any arrangement.

Additionally, the shuttling controller 102A-102D may be provided as a unitary controller, with a single controller controlling any number or size of the ion trap areas 104A-104D. The ion trap areas 104A-104D may also be cascaded so that additional ion trap areas 104A-104D and shuttling controllers 102A-102D may be connected to existing ion trap areas 104A-104D and shuttling controller 102A-102D to expand the shuttling area, number of ions controlled, and capabilities of the system 100.

The system 100 may also have a voltage compensation system 112 that provides compensation voltages to individual electrodes in one or more of the ion trap areas 104A . . . 104D. The compensation voltages may, in come embodiments, be provided to compensation electrodes separate from the shuttling electrodes, so that the region of each shuttling electrode may have a DC voltage field applied separate from the field provided by the shuttling controller voltages applied to the respective shuttling electrode. Thus, each shuttling electrode or shuttling electrode set may have one or more associated compensation electrodes. The voltage compensation system may provide voltages at the compensation electrodes to compensate for the deviation from target voltage provided by the DAC when the shuttling or keeping voltage is applied to the shuttling electrodes. Additionally, the compensation system may provide the voltage to the compensation electrodes as an electrostatic voltage by, for example charging a capacitor connected to the compensation electrodes, and then disconnecting the capacitor and compensation electrode from a charging or discharging circuit. When disconnected, the capacitor stays charged for a relatively long time, so that the charge may be periodically adjusted, refreshed, updated or otherwise maintained. This permits many compensation electrodes to be serviced by a single DAC. Alternatively, the voltage compensation system may provide a voltage to a capacitor connected to the shuttling electrodes, however, such a system requires additional switching and wiring to avoid the compensation charge from negatively impacting the voltage applied by shuttling controller 102A . . . 102D.

Additionally, the voltage compensation system 112 may provide different voltages to a set, or a pair, of compensation electrodes associated with particular confinement or shuttling electrode or group of electrodes, which permits lateral shifting of an ion to align the DC trapping point with the RF trapping point.

Use of separate, dedicated electrostatic charges for separate compensation electrodes permits a few, or even one, DACs to charge capacitors for a large number of electrodes and provide a different voltage compensation for each compensation electrode or electrode set. Different electrostatic charges for the separate compensation electrodes provides finer compensation along ion shuttling pathways than controlling compensation electrodes with a single voltage source. Additionally, the use of electrostatic charges on individual capacitors associated with individual electrodes or sets of compensation electrodes avoids the need to provide a dedicated DAC for each shuttling electrode and avoids the need to use separate DACs to maintain unique voltages across a plurality of shuttling electrodes.

Similar to the arrangement of the shuttling controllers 102A . . . 102D, the voltage compensation system 112 may be a unitary system or controller where a single voltage compensation system 112 drives multiple ion trap areas 104A-104D, or may include multiple sub-systems that each drive one or more ion trap areas.

The system 100 may have a radio frequency (RF) system (not shown) that provides an RF containment field separately from the DC bias of the shuttling electrodes and from the DC fields of the compensation electrodes. The RF field may be provided by electrodes that are separate from electrodes used to provide a shuttling or keeping voltage fields or compensation voltage fields. In some embodiments, the RF field may be operated at around 200 volts, and 20 megahertz (MHz), and the DC fields may be provided locally and separately to shuttle ions being contained by the RF field.

Figure 2:
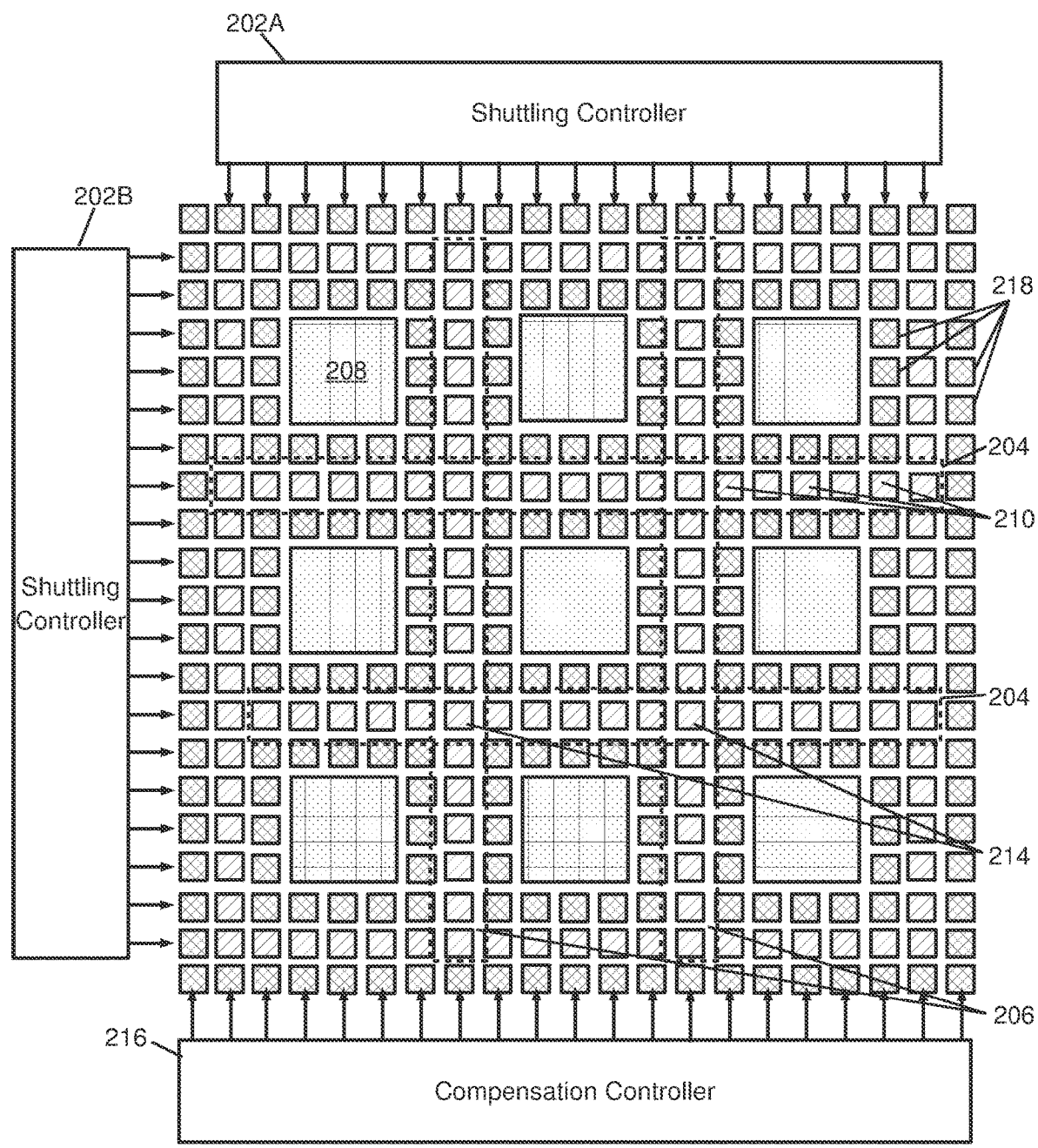
FIG. 2 is a diagram illustrating an ion shuttling system with compensation electrodes according to some embodiments.

FIG. 2 is a diagram illustrating an ion shuttling system 200 according to some embodiments. The ion shuttling system 200 includes a shuttling controller 202 comprising a first shuttling controller portion 202A and second shuttling controller portion 202B. The first shuttling controller portion 202A and second shuttling controller portion 202B may be connected to a set of confinement or shuttling electrodes 210 arranged in a two-dimensional pattern, or in another arrangement with one dimension, or in three dimensions for layered patterns.

The ion shuttling system 200 may further have a compensation controller 216 connected to a set of compensation electrodes 218. While the shuttling electrodes 210 and compensation electrodes 218 are generally shown with a pair of compensation electrodes 218 and a single shuttling electrode 210 between the associated compensation electrodes 218, the provided compensation electrode 218 arrangement is illustrative of the principles of the ion shuttling system 200 with compensation electrodes 218, and is not limited limiting. For example, the system 200 may have a single layer, or multiple layers, of electrodes 210, 218. The ion shuttling system 200 have also additional electrodes such as RF electrodes (not shown) disposed adjacent to, or between the shuttling electrodes 210 and compensation electrodes 218. In some embodiments, the system 200 may have a lane element (not shown) along which an ion may be shuttled. In some embodiments, more than two compensation electrodes 218 may be associated with a particular shuttling electrode 210, and a pair or set of compensation electrodes 218 may be associated with multiple shuttling electrodes 210. For example, one or more shuttling electrodes 218 may each have four associated compensation electrodes, with two compensation electrodes 218 on each side of the particular shuttling electrode 210. In another example, multiple shuttling electrodes 210 may share, or be associated with, the same set or pair of compensation electrodes, with a single compensation electrode 218 extending along a side of multiple shuttling electrodes 210, and a second compensation electrode 218 extending along another side of the shuttling electrodes 210 so that multiple shuttling electrodes 210 are between a pair or set of compensation electrodes 218.

The shuttling controller 202 provides a direct current (DC) biasing voltage to the shuttling electrodes 210 to move and steer ions along shuttling lanes 204, 206. The shuttling controller 202 provides a voltage to each shuttling electrode 210, which is set by a latch associated with the shuttling electrode 210. Using a latch, rather than a DAC, at each shuttling electrode 210 permits for a lower component count, as the DAC requires a far greater number of components than a latch. Scaling up the number of electrodes while using a limited number of DACs permits greater density and higher electrode counts while simplifying production of the ion shuttling system 200.

The shuttling controller 202 may address an individual electrode element, which includes the latch and shuttling electrode 210 itself, and may provide a voltage signal or other signal to set the voltage for a particular shuttling electrode 210, which is held by the shuttling electrode's 210 associated latch. Thus, the voltage of each shuttling electrode 210 may be set individually, and is maintained until reset or changed.

In some embodiments, the shuttling controller 202 addresses the individual shuttling electrodes 210 using an electrode control or addressing system, which controls application of a voltage to the shuttling electrodes 210. Thus, the shuttling electrode 210 in a particular column and row may have a shuttling voltage that is set by routing a voltage controlled by a DAC to a latch or storage element, such as a capacitor for the respective shuttling electrode 210, so that the electrode latch or storage element sets the voltage at the shuttling electrode 210.

In other embodiments, an RF field generated by voltages applied to the RF electrodes may hold an ion in controlled position relative to the electrodes, or over a lane element, where present. The DC shuttling field provided by the shuttling electrodes 210 causes the ion to move along the electrodes or lane elements, and the DC compensation field provided by the compensation electrodes 218 adjusts the DC field provided by the shuttling electrodes and shifts the ion in a direction substantially perpendicular to the movement direction provided by the shuttling field.

In some embodiments, movement or shuttling of the ion is performed by setting a DC voltage on an electrode to create DC bias in the E-field, with the DC bias allowing control of the position of an ion along, or parallel to the lane 204. Changing the voltage on the shuttling electrodes 210 permits control of the movement of the ion, and ions may be moved along shuttling lanes 204, 206. The shuttling lanes 206, 204 may be arranged so that shuttling lanes 204, 206 cross to form intersections 214 to allow for switching an ion onto different shuttling lanes 204, 206 for two dimensional movement. The shuttling electrodes 210 may be arranged so that free space is created between the shuttling electrodes 210, and shield elements 208 may be provided to shield the shuttling electrodes 210 and ions located in shuttling lanes 204, 206, from voltages provided for other ions in other locations along the shuttling lanes 204, 206. Such an arrangement may reduce cross-talk between ions in the shuttling system 200 and simplify production of the shuttling system 200. Additionally, while the shuttling lanes 204, 206 and shuttling electrodes 210 are arranged in FIG. 2 in a symmetrical pattern, the shuttling electrodes 210 and shuttling lanes 204, 206 are not limited to such an arrangement, as any arrangement in two dimensions may be provided, including an arrangement where shuttling lanes 204, 206 intersect or cross at non-right angles. Additionally, shuttling lanes 204, 206 are not limited to crossing each other, as the shuttling lanes 204, 206 may form a three way, or 'T' intersection, or may form a turn or angle, such as an 'L' shaped intersection.

Figure 3A:
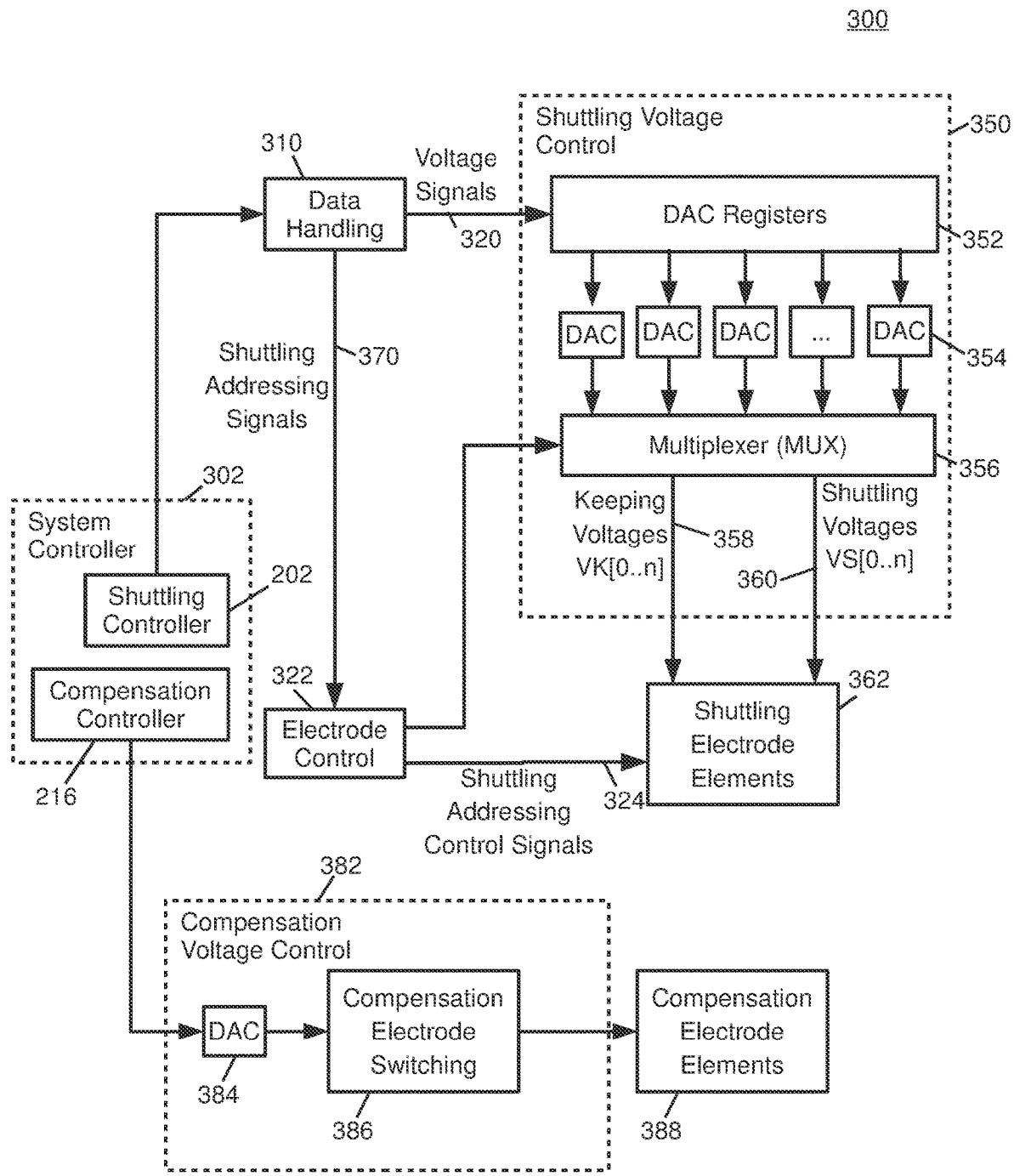
FIG. 3A is a diagram illustrating an ion shuttling control and compensation voltage system according to some embodiments.

FIG. 3A is a diagram illustrating an ion shuttling control system 300 according to some embodiments. The ion shuttling control system 300 may have a data handling element 310 that receives data from a shuttling controller 202 of a system controller 302, and provides voltage signals 320 or data values to a voltage control 350 and addressing signals or values an electrode control 322. The voltage control 350 generates voltages from the data values, with the voltages applied to electrode elements 362 for creating the E-field at the electrodes. The electrode control 322 provides signals to the shuttling electrode elements 362 to activate particular shuttling electrode 362 elements to load or set the voltage provided by the voltage control 350.

In some embodiments, the shuttling controller 202 may indicate ion control information to a data handling element 310. The ion control information may, in some embodiments, such as a location for an ion within an ion trap, one or more voltages or voltage profiles for one or more electrodes, data indicating a path for ion movement or the like. Thus, the shuttling controller 202 may determine where a shuttling electrode group is located, and may identify or provide information for identification of the shuttling electrode group or shuttling electrodes or electrode elements. Additionally, the shuttling controller 202 may provide information for shuttling voltage or the like, so that the system may determine shuttling voltages for controlling ion movement.

The data handling element 310 may receive, and in some embodiments, decode, ion control information from the shuttling controller 202. The ion control information may include, for example, one or more voltage values and associated addresses, and the data handling element 310 may determine the column and row of a shuttling electrode to be addressed and set with the associated voltage, and may provide shuttling addressing signals 370 to the electrode control 322, and provide an ion movement control voltage to the shuttling voltage control 350. The ion movement control voltage may, in some embodiments be a confinement or keeping voltage, that is part of a neutral voltage profile, holds an ion in a location, or may be a shuttling voltage that is part of a shuttling voltage profile used to move, or shuttle, an ion between locations.

In some embodiments, the voltage values may include information, data, or values for a neutral voltage profile for holding an ion on a particular location, or include information, data or values for shuttling voltages for a voltage profile such as a shuttling voltage profile for moving an ion between shuttling electrodes. In some embodiments, a neutral voltage profile may be different from a shuttling voltage profile, with a symmetrical or simpler voltage profile since an E-field gradient needed to maintain an ion in a fixed location requires less shaping than an E-field gradient that would cause an ion to move in a desired direction. Additionally in some embodiments, the voltages may be keeping voltages for maintaining a base, default, or standard bias voltage against which the neutral voltage profiles or shuttling voltage profiles are changed to provide a localized E-field gradient to trap or control the ions.

In some embodiments, the ion control information may include an explicit address for a particular associated voltage level, and the ion control information may indicate explicit addresses and voltages for each electrode being set for a particular voltage profile. The voltage level may be indicated as an explicit voltage level as an integer or real number, such as +7.2 volts. In other embodiments, the voltage level may be indicated by an index that determines the voltage level from a predetermined formula, table, or the like. For example, the voltage may be indicated by an index of 4, which may be used to reference a table indicating a desired voltage value of +7.0 v, or may be used in a calculation to determine the desired voltage, for example, by multiplying the index by a voltage factor to determine the desired voltage level.

In other embodiments, the ion control information may define a voltage profile and a base location. A voltage profile may indicate a type of movement, type of voltage profile, or the like, and the voltages for multiple electrodes that would be determined to provide the voltage profile may be predefined. For example, a voltage profile may have predetermined voltages for electrodes, with a first electrode pair at +6 v, a second electrode pair at +2 v, a third electrode pair at +4 v, and a fourth electrode pair at +7 v, the ion control information may describe an address for one or more of the electrode pairs, and the voltage for each electrode pair of the voltage profile may be determined based on the electrode pair's relative location to address based on the predetermined voltages for the voltage profile. In another embodiment, the ion control information may also describe a movement direction for the voltage profile so that an asymmetric voltage profile may be oriented correctly. In some embodiments, the ion control information may also include a path, speed or movement profile for the ion so that a voltage may be set by the decoder based on a time function, with, for example, new electrode voltages being set every second to move the voltage profile or change the voltages, causing the ion to move along the identified path or in the identified direction.

In some embodiments, the voltage control 350 comprises DAC registers 352, DACs 354 and a multiplexer (MUX) 356. The DAC registers 352 hold voltage values for the DACs, and the DACs convert digital voltage values to analog voltage values or signals. The DAC registers 352 may be used to hold the voltages long enough for the DACs 354 to propagate an analog voltage through themselves and through the multiplexer 356 to be provided to by the electrode elements 362. The analog voltage values may be sent to a multiplexer 356 that receives addressing information to route particular voltages to particular columns of electrode elements 362. Each DAC 354 may be set with a keeping voltage or shuttling voltage, so that, for example, an entire row, column, segment of columns or rows may be set. Setting a single row, column, row segment or column segment of the electrodes permits a limited number of DACs 354 to be used, as the DACs 354 may be reused to set another group of electrodes.

In some embodiments, the multiplexer 356 may be an analog multiplexer that passes on analog voltages rather than simply providing digital output levels. Additionally, the analog multiplexer may be configured to allow selection of an analog shuttling voltage and selection of a keeping voltage for a plurality of electrodes.

The electrode control 322 may provide a control signal that selects one or more DACs 354 used to provide one or more voltages to selected electrode elements 362. In some embodiments, the multiplexer 356 may selectively provide a shuttling voltage VS 360 selected from a plurality of shuttling voltages VS 360 on a first output for a particular electrode column, and a keeping voltage VK 358 or neutral voltage selected from a plurality of keeping and neutral voltages on a second output for the particular electrode column. Providing both the shuttling voltage VS 360 and the keeping voltage VK 358 to a particular electrode permits the shuttling voltage VS 360 and keeping voltage VK 358 to be set to separate values, with an electrode enable signal ESEL provided to the electrode element 362 to be used to select between the shuttling voltage VS 360 and keeping voltage VK 358 for application to the electrode, and also allows each electrode in a group to be selectively set to the shuttling voltage VS 360 or keeping voltage VK 358 using the electrode enable signal. Additionally, the multiplexer 356 may be configured to receive a plurality of different shuttling voltages VS 360 from a first plurality of the DACs 354, and provide at least one of the different shuttling voltages VS 360 to one or more outputs associated with the different electrode column. Thus, a DAC 354 may provide a shuttling voltage VS 360 that is used to set electrode elements 362 in different columns, reducing the number of DACs 354 required to set a great number of electrode elements 362. This may be achieved by setting different DACs to the different voltages required for a shuttling voltage profile, and using the DAC 354 to provide the required voltages for the different electrodes, rather than having a single DAC associated with electrode in a group, and potentially setting multiple DACs with the same voltage. Similarly, another DAC 354 may provide a keeping voltage VK 358 used to set a voltage in multiple electrodes, reducing the number of needed DACs 354.

In some embodiments, the electrode control 322 receives the shuttling addressing signals 370 indicating which electrodes are activated and further indicating which electrodes are shuttling electrodes, namely electrodes that are assigned to have a voltage that is part of a shuttling voltage profile.

In some embodiments, the system controller 302 further has a compensation controller 216 that provides a signal having compensation control information describing locations and compensation voltages for one or more compensation electrode elements 388. The compensation control information may be used to set an output voltage of a voltage source, such as DAC 384, that may be routed, or selectively connected, by a compensation electrode switching element 386 to one or more selected compensation electrode elements 388 identified in the compensation control information, or by the compensation controller 216. In some embodiments, the compensation electrode switching element 386 may have one or more switches, such as transistors, that are controlled by a signal from the compensation controller 216 to selectively connect the DAC 384 to the selected compensation electrode element 388. In some embodiments, the compensation electrode switching element 386 may, in some embodiments, connect a single DAC 384 to multiple compensation electrode elements 388 at the same time so that the single DAC 384 applies the same voltage to multiple electrodes. Thus, the DAC 384 may receive digital information describing a compensation voltage, which is converted into an analog voltage by the DAC 384, and is provided to one or more compensation electrode elements 388 by one or more connections created by the compensation electrode switching element 386.

Figure 3B:
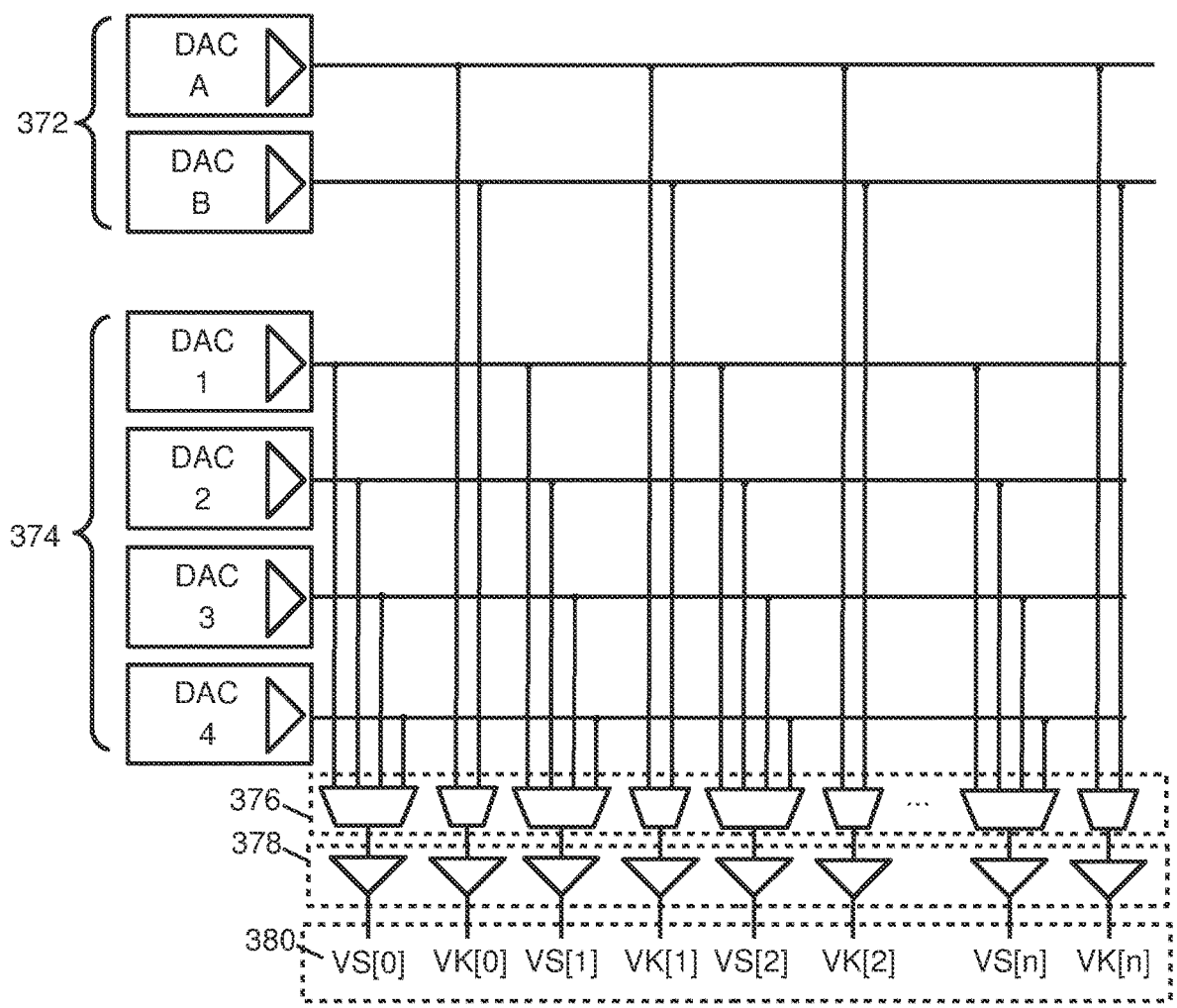
FIG. 3B is a diagram illustrating an analog multiplexer for an ion shuttling control system according to some embodiments.

FIG. 3B is an analog multiplexer 371 for an ion shuttling control system according to some embodiments. The analog multiplexer 371 routes or connects DACs 372, 374 to electrode elements by selectively passing output signals from DAC 372, 374 as keeping voltages VS[0 . . . n] and keeping voltage VK[0 . . . n], which are then routed to the selected electrode. Then analog multiplexer 371 may have a plurality of line multiplexers 376 that multiplex signals from a plurality of DACs 372, 374. The DACs 372, 374 may include a plurality of keeping voltage DACs 372 and a plurality of shuttling voltage DACs 374. The line multiplexers 376 provide output signals 380 to different lines, or set of electrodes, and may include a plurality of shuttling voltage multiplexers and a plurality of keeping voltage multiplexers. Additionally, in some embodiments, each line multiplexer 376 provide an output signal 380 through a buffer 378, or through one or more other elements for processing, handling, manipulating or modifying the output signal 380.

Each shuttling voltage multiplexer is connected to a plurality of the shuttling voltage DACs 374, and may be switched to provide a shuttling voltage VS[0 . . . n] to a plurality of different electrodes by connecting a selected one of the shuttling voltage DACs 374 to one or more electrodes. Similarly, each keeping voltage multiplexer is connected to a plurality of the keeping voltage DACs 372, and may be switched to provide a keeping voltage VK[0 . . . n] to a plurality of different electrodes by connecting a selected on the keeping voltage DACs 372 to one or more electrodes. The electrodes may then be activated and selected to turn on the electrode and cause the electrode to use the provided shuttling voltage VS[0 . . . n] or the provided keeping voltage VK[0 . . . n].

Figure 3C:
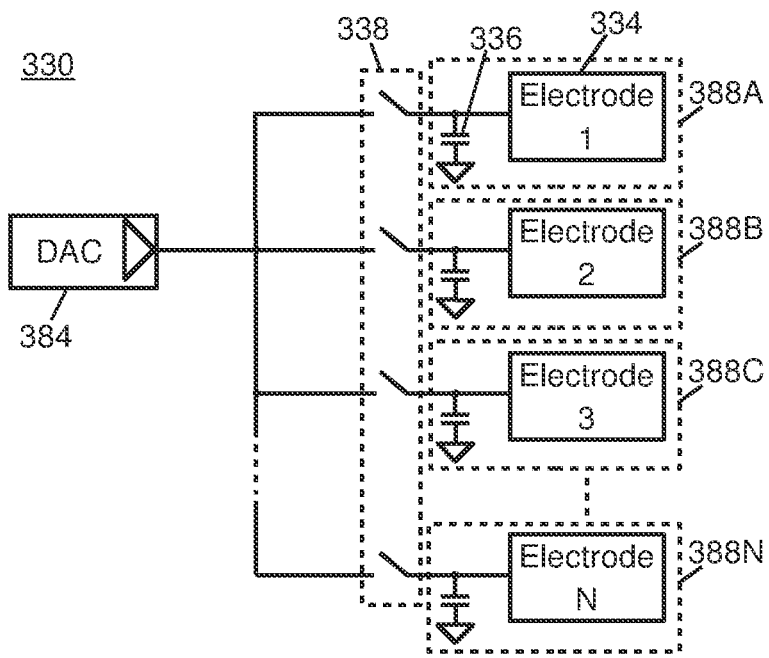
FIGS. 3C-3D are diagrams illustrating voltage compensation systems for an ion shuttling control system according to some embodiments.

FIG. 3C is a diagram illustrating a voltage compensation control system 330 according to some embodiments. The system 330 has one or more compensation electrode elements 388A . . . 388N, with each of the compensation electrode elements 388A . . . 388N having a compensation electrode 334 and a capacitor 336 connected to each other at a first node, and the capacitor 336 connected between the first node and a ground or reference voltage. The compensation electrode 334 may have, for example, a plate shape with major surface exposed to, or facing, an ion travel path. A plurality of switches selectively connect a DAC 384 to each of the compensation electrode elements 388A . . . 388N at the first node.

Each of the switches 338 may be associated with one or more of the compensation electrode elements 388A . . . 388N, so that each compensation electrode 388A . . . 388N may be selectively coupled or decoupled with the DAC independently of the connection status of other compensation electrode elements 388A . . . 388N. In some embodiments, the switches 338 may be controlled by the compensation controller, or by other logic or control systems, such as the shuttling controller, system controller, outside device, or another device.

Each compensation electrode element 388A . . . 388N may be charged by connecting the respective compensation electrode element 388A... 388N to the DAC 384 to charge the capacitor 336, then disconnected so that the capacitor 336 maintains the set voltage at the first node and electrode. Thus, the number of compensation electrode elements 388A... 388N is not limited herein, as each capacitor 336 may be charged by a voltage and then disconnected from the DAC so that the DAC 384 may be used to sequentially set voltages across a large number of compensation electrode element 388A... 388N. Additionally, the switches 338 may connect more than one compensation electrode element 388A... 388N to the DAC 384 at the same time so that the DAC 384 applies the same voltage to each of the connected compensation electrode elements 388A... 388N at the same time. In some embodiments, each DAC 384 may be configured to service at least 100,000 compensation electrode elements, and may have a cycle, or recharge, time between 1 second and 1 minute. Thus, the switches 338 may be controlled to set or refresh the voltage on each compensation electrode element 388A... 388N periodically to avoid decay or leakage current in the capacitors 336 from distorting, or changing, the compensation voltage outside of a tolerance, for example, of about a 5% variance from the intended compensation voltage. Additionally, the capacitors 336 may be sized so that they can be charged by the DAC 384 within a reasonable time, with a capacitance between about 1 picofarad (pF) and 1 nanofarad, and in some embodiments, with a capacitance of about 10 pF.

Figure 3D:
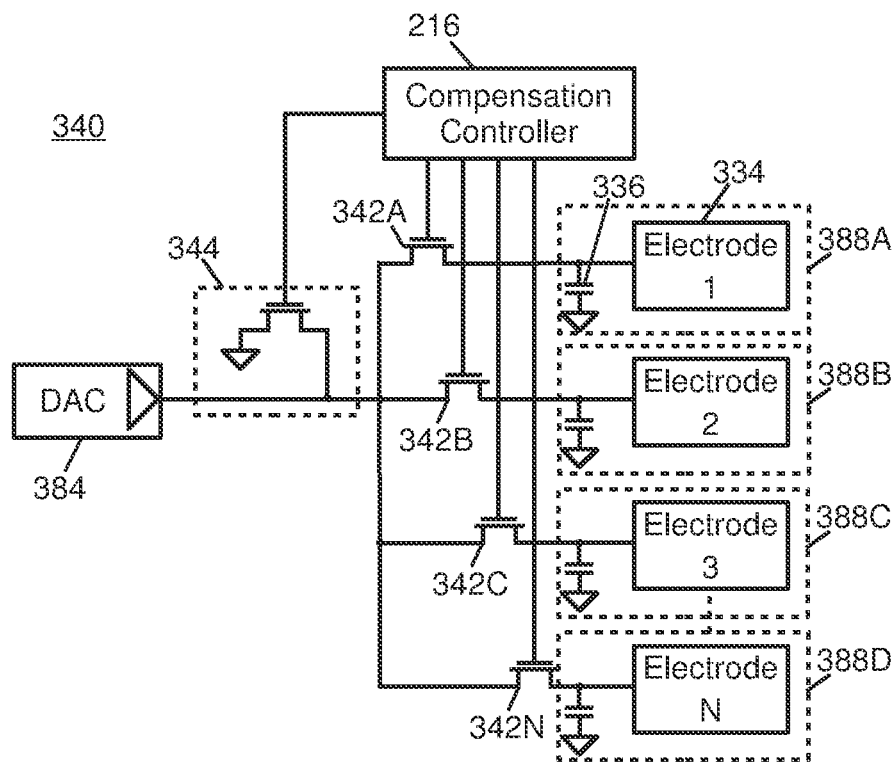

FIG. 3D is a diagram illustrating a voltage compensation control system 340 according to some embodiments. In this voltage compensation control system 340, the switches are transistors 342A... 342N, with a single transistor 342A... 342N connecting a respective compensation electrode element 388A... 388N to the DAC 384. The transistors 342A... 342N may each be controlled by the compensation controller 216 through a signal used by the compensation controller 216 to control the gate of each transistor 342A... 342N. Additionally, the voltage compensation control system 340 may have a discharge circuit 344 controlled by the compensation controller so that the compensation controller 216 may selectively discharge one or more compensation electrode elements 388A... 388N individually, or in a group.

Thus, an ion trap system, or ion shuttling system may include a plurality of first electrodes connected to a system configured to selectively provide an ion movement control voltage to each electrode of the plurality of first electrodes, a voltage source configured to provide one or more compensation voltages, a plurality of compensation electrodes comprising a plurality of compensation electrode pairs, wherein each compensation electrode pair of the plurality of compensation electrode pairs is associated with one or more different first electrodes of the plurality of first electrodes. The system may also include a plurality of switches, wherein each switch of the plurality of switches is connected at a respective first node to a compensation electrode of the plurality of compensation electrodes and is configured to selectively connect the respective compensation electrode to the voltage source. The compensation system may be configured to provide a compensation electrical field (E-Field) to an ion being shuttled by an associated one or more first electrodes to shift an ion, which is affected by a stray voltage, toward an RF trapping point in response to compensation voltages provided to the compensation electrodes of the compensation electrode pair. The ion trapping or ion shuttling system may be configured to hold an ion in a predetermined location using a neutral voltage profile, or to provide a shuttling profile for shuttling an ion between ion trap areas, ion reservoirs, a processing area, or a readout area, while using a compensation voltages to shift the ion laterally within the specified location, or within a shuttling lane.

Additionally, an ion trap system or ion shuttling system may include one or more radio frequency (RF) electrodes connected to an RF generation system and configured to create an RF trapping point and to trap an ion, a plurality of first electrodes configured to control movement of an ion along a movement direction by generating an electrical field as a result of being provided with an ion movement control voltage, a voltage source configured to provide one or more compensation voltages, and a plurality of compensation electrodes comprising a plurality of compensation electrode pairs. Each compensation electrode pair of the plurality of compensation electrode pairs is associated with a one or more different first electrodes that are of the plurality of first electrodes and that are disposed between compensation electrodes of the associated compensation electrode pair, and each compensation electrode pair is configured to provide a compensation electrical field (E-Field) to an ion being shuttled by an associated one or more first electrodes to shift an ion, which is affected by a stray voltage, toward the RF trapping point in response to compensation voltages provided to the compensation electrodes of the compensation electrode pair. The system may also include a plurality of switches, wherein each switch of the plurality of switches is configured to selectively connect a respective compensation electrode of the plurality of compensation electrodes to the voltage source. The ion trapping or ion shuttling system may be configured to hold an ion in a predetermined location using a neutral voltage profile, or to provide a shuttling profile for shuttling an ion between ion trap areas, ion reservoirs, a processing area, or a readout area, while using a compensation voltages to shift the ion laterally within the specified location, or within a shuttling lane.

Figure 4A:
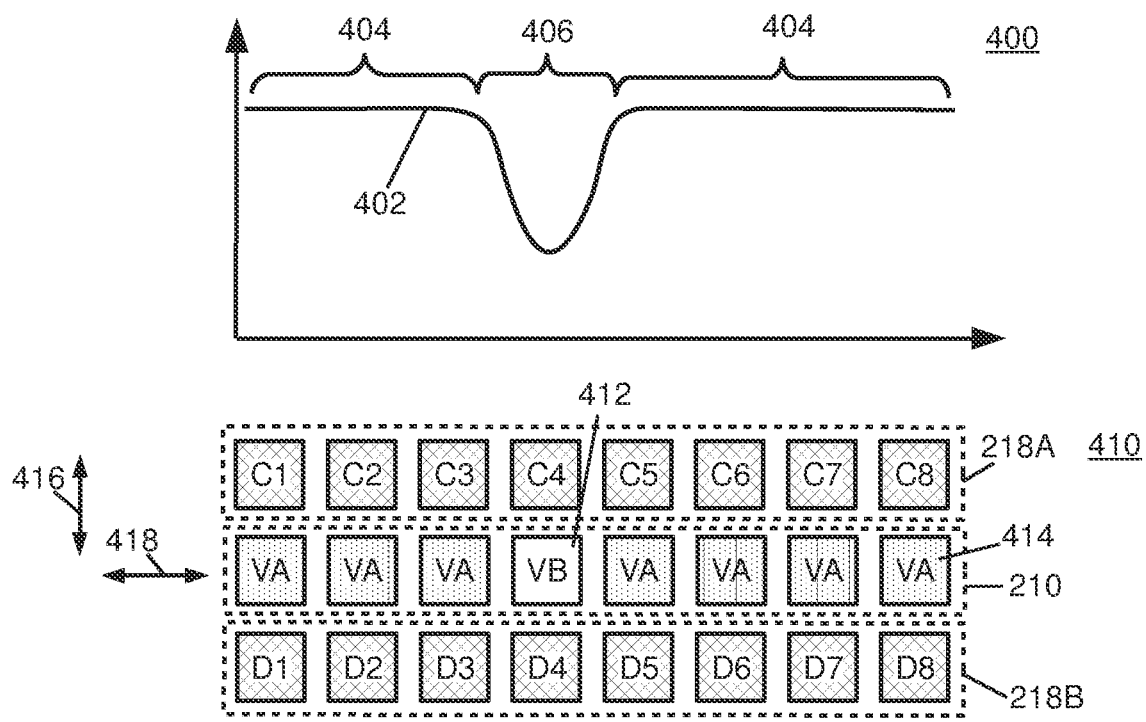
FIGS. 4A-4B illustrate application of voltages to an ion shuttling system according to some embodiments.
Figure 4B:
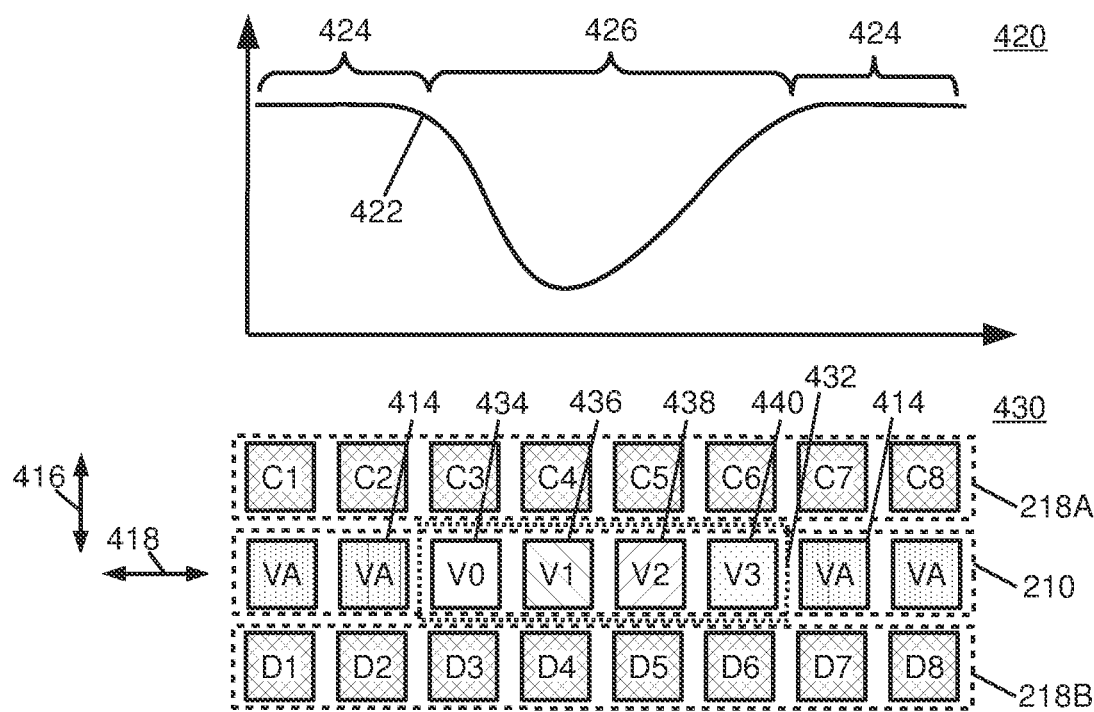

FIGS. 4A-4B illustrate application of voltages VA, VB, V0-V3 to an ion shuttling system according to some embodiments. FIG. 4A illustrates a chart 400 showing a neutral voltage profile 402 and system 410 having a set of shuttling electrodes 210 providing the neutral voltage profile 402 and a set of compensation electrodes 218.

A neutral voltage profile 402 may be one or more voltages applied to shuttling electrodes 210 that create a symmetrical E-field used to hold an ion in a particular location. The movement of the ions is controlled by a DC bias applied to shuttling electrodes 210 to control movement in a movement direction 418 along the shuttling electrodes 210. The neutral voltage profile 402 may, in some embodiments, be provided by a neutral voltage region 406 that separates two keeping regions 404. The keeping regions have a default or keeping voltage VA that repels an ion more than the neutral voltage VB in a neutral voltage region 406. A neutral region voltage VB may be applied to one or more target electrodes 412, and the target electrodes 412 may be located between keeping electrodes 414 that have a keeping voltage VA applied. The neutral voltage profile 402 creates a well in the neutral voltage region 406 that allows the ion to remain controlled and substantially motionless or generally in a defined location. For example, for a positively charged magnesium ion ($Mg^+$), the keeping voltage VA used for the keeping regions 404 has a greater positive magnitude than a neutral voltage VB of a neutral voltage region 406. In some embodiments, the DC bias voltages may be in the 10 v range, with, for example, the keeping voltage VA being set at about 10 v to create the keeping regions 404, and a neutral voltage VB or shuttling voltage used to create the neutral voltage region 406 being set around 2 v, set to a negative voltage, or set to another voltage with a voltage differential from the keeping voltage permitting control of an ion. The higher voltages of the keeping regions 404 create a stronger positive E-field, causing the ion to remain trapped in the neutral voltage region 406. It should be understood that these voltage values are merely an example, as actual voltages may vary greatly based on different shuttling approaches, trap geometries, ion species, ion distance to surface, and the like.

In some embodiments, first compensation electrodes 218A may be positioned opposite the shuttling electrodes 210 from second compensation electrodes 218B. Each shuttling electrode 210 may be associated with, and positioned between, a pair of compensation electrodes 218A, 218B. Opposing compensation electrodes 218A, 218B may have differential DC voltages applied to create an E-field gradient in a lateral direction or compensation direction 416 across, or substantially perpendicular to, the movement direction 418. The compensation direction 416 may be parallel to, or in the direction of, a line passing through both electrodes of the pair of compensation electrodes 218A, 218B. This allows for a compensation electrode pair to laterally adjust the position of an ion to ensure that the ion is centered in the RF field, avoiding unintended micromotion of the ion as it is shuffled, reducing heating and delaying unintended ion disentanglement. Each compensation electrode pair may have an individually set differential voltage, with each first compensation electrode 218A having a voltage set independently of each other first compensation electrode 218A. The individually set voltage differential permits adjustment of the ion when the ion is positioned over each different shuttling electrode 210 to account for process variations in production of the DACs and other discrete devices, as well as variations in the physical structure of the shuttling electrodes 210 or RF electrodes that might cause the trapping point in the E-field of the RF system to be misaligned with the trapping point of the DC E-field of the shuttling electrodes 210. For example, the C3-D3 electrode pair may have a different differential voltage than the C4-D4 electrode pair. This may be accomplished by setting the voltage at the C3 electrode to +8 v and the setting the voltage at the D3 electrode to +6 v, creating a +2 volt differential in the compensation direction toward C3. The voltage at C4 may be set to 5 v and the voltage at D4 set to +10 v, creating a −5 v differential on the same direction, or a positive differential in the direction opposite the direction of the voltage differential of the C3-D3 electrode pair. This would tend to push a positively charged ion in the compensation direction 416 toward D3 when the ion is held between the C3-D3 electrode pair, and to push the positively charged ion toward D4 along the compensation direction 416 when the positively charged ion is held between the C4-D4 electrode pair.

FIG. 4B illustrates a chart 400 showing a shuttling voltage profile 422 and system 430 having a set of shuttling electrodes 210 providing the shuttling voltage profile 422. A shuttling voltage profile 422 may be a set of voltages applied to shuttling electrodes 210 that creates an asymmetrical E-field to move an ion along a movement direction along, or parallel to, the shuttling electrodes 210. The shuttling voltage profile 422 may, in some embodiments be provided by a shuttling voltage region 426 that separates two keeping regions 424. In the shuttling voltage profile 422, the keeping regions 424 have a default voltage or keeping voltage VA that repels an ion more than the shuttling voltage V0 . . . V3 in a shuttling voltage region 426, similar to the neutral voltage region 406. However, the shuttling voltage region 426 may have an asymmetric E-field that provides a voltage field with lower voltage gradient or E-field gradient at one side that causes movement in a desired direction.

For example, a shuttling voltage profile 422 may be formed by a shuttling electrode group 432 having a first bounding shuttling electrode 434 with a first bounding shuttling voltage V0, an intermediate shuttling electrode 436 with an intermediate shuttling voltage V1 applied, and one or more additional bounding shuttling electrodes 438, 440 with additional bounding shuttling electrode voltages V2, v3 applied. In some embodiments, the additional bounding shuttling electrodes 438, 440 have different bounding shuttling voltages V2, V3 to provide a region with an E-field gradient or voltage gradient that is more shallow, or more gradual than a region with an E-field gradient or voltage gradient generated by the first bounding shuttling voltage V0. In some embodiments, this may be achieved by having a third bounding shuttling electrode 440 with a third bounding shuttling voltage v3 and a second bounding shuttling electrode 438 with a second bounding shuttling voltage v2, with the third bounding shuttling electrode 440 and the second bounding shuttling electrode 438 located between the intermediate shuttling electrode 436 and a keeping electrode 414. In some embodiments, the third bounding shuttling voltage V3 may be higher than the second bounding shuttling voltage V2, and the second and third bounding shuttling voltages V2, V3 may be between the keeping voltage VA and the intermediate shuttling voltage V1. Similarly, the first bounding shuttling voltage V0 may be between the keeping voltage VA and the intermediate shuttling voltage v1. For example, for the above mentioned $Mg^+$ ion, the keeping voltage VA may have a voltage profile with a maximum +10 v DC bias, the first bounding shuttling voltage V0 may have a voltage profile with a maximum +6 v DC bias, the intermediate shuttling voltage V1 may have a voltage profile with a maximum +2 v DC bias, the second bounding shuttling voltage V2 may have a voltage profile with a maximum +5 v DC bias, the second and the third bounding shuttling voltage V3 may have a voltage profile with a maximum +8 v DC bias. In other embodiments, the shuttling voltages may have voltages profiles with different DC biases, in, for example, a range of +/−40 v, and the voltages may be negative. Additionally, voltage profiles with larger voltages (either positive or negative) may be used to drive, for example, passive components at each electrode.

The shuttling electrodes 210 contain the ion within, or on, a lane or along the shuttling electrodes 210. The shuttling electrode group 432 may be adjusted to include different shuttling electrodes 210 by adjusting the voltage of various shuttling electrodes 210, effectively shifting the shuttling electrode group 432. The DACs provide each voltage necessary for forming the shuttling electrode group 432, and the multiplexer routes the shuttling voltages to selected shuttling electrodes 210 to form the shuttling electrode group 432. The DACS periodically route the shuttling voltages to different electrodes to shift the shuttling electrode group or form the shuttling electrode group 432 in a new location to move the ion.

Similar to the neutral voltage profile discussed above, compensation electrode pairs may have differential voltages applied when an ion is moved along the movement direction 418 by a shuttling voltage profile 422 provided by a shuttling electrode group 432. Applying the aforementioned voltages to the C3-D3 and C4-D4 electrode pairs would push a positively charged ion in the compensation direction 416 toward D3 as the ion moves between the C3-D3 electrode pair, and would subsequently push the positively charged ion in the opposite direction toward D4 along the compensation direction 416 as the ion passes along the movement direction 418 between the C4-D4 electrode pair.

While illustrated with four sets of electrodes in the shuttling electrode group 432, it should be understood that any number of shuttling electrodes may be used to form the shuttling electrode group 432, with more shuttling electrodes enlarging the voltage profile and spreading the voltage profile over a larger distance, which allows for more rapid shuttling of the ion with less heating of the ion.

Figure 5A:
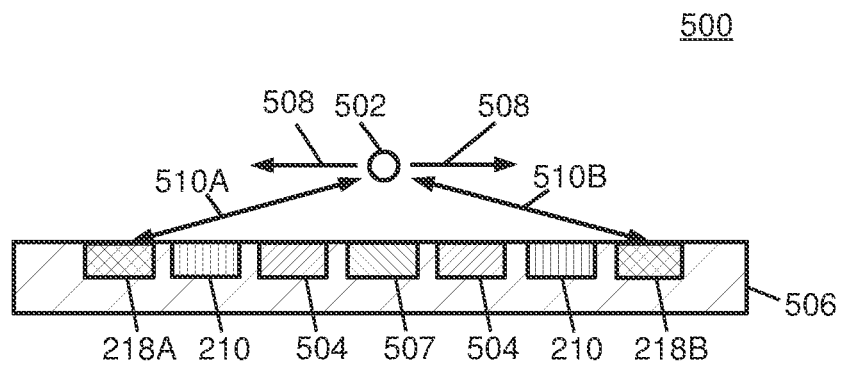
FIGS. 5A-5C are diagrams illustrating a two-dimensional (2D) ion shuttling system with outer compensation electrodes according to some embodiments.
Figure 5A:
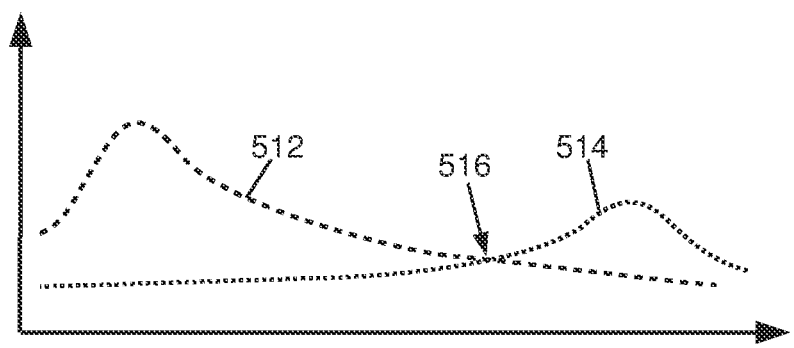
Figure 5B:
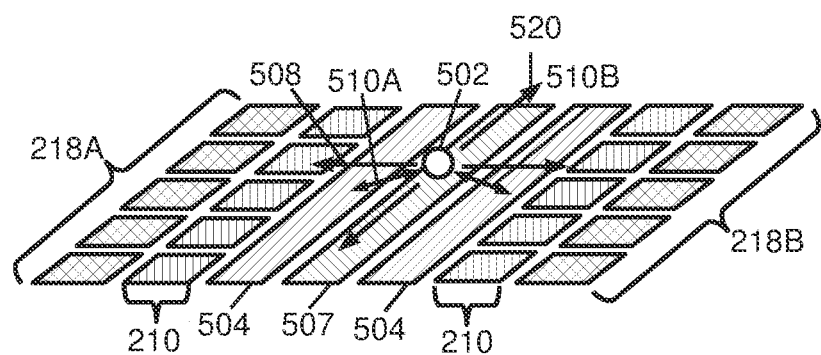
Figure 5C:
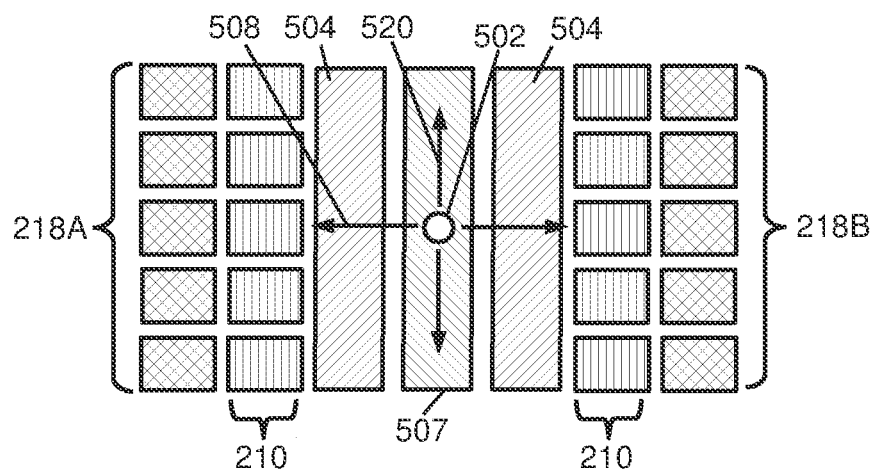

FIGS. 5A-5C are diagrams illustrating a 2D ion shuttling system 500 with outer compensation electrodes 218A, 218B according to some embodiments. FIG. 5A is a diagram illustrating a cutaway view of a 2D ion shuttling system 500 with outer compensation electrodes 218A, 218b and an E-field profile in a compensation direction 508. In some embodiments, the ion shuttling system 500 may be formed using semiconductor packaging or fabrication techniques, for example, by depositing conductive material on a substrate and forming electrodes, lane elements, shields, connectors, and the like, in, for example, glass or oxide layers. Additionally, connection layers, such as layers of conductive wiring, may be formed as a stack or on the backside of the system to provide connections to control elements such as multiplexers, DACs, and the like. One or more other devices, such as transistors, or logic gates, or other circuits may also be formed or located on the surface of the system substrate 506, on the backside of the substrate 506, on the wiring layers, or the like, to permit integration of the system elements into a package or system-on-chip (SoC). Additionally, any analog or digital circuit may be integrated with the passive part of the ion trap consisting of electrodes and wiring, and integration may be done on the same substrate or using stacked dies.

In the 2D ion shuttling system 500, one or more metal elements may be formed in a metallization layer, for example, using a damascene etch-and-fill process. The metallization layer may have a substrate 506 such as an insulator layer, that may be, for example, a silicon dioxide, glass, or other insulating material. Compensation electrodes 218A, 218B, RF electrodes 504, RF ground electrodes 507 and confinement or shuttling electrodes 210 may be formed in the metallization layer, and may be a conductive material such as copper, aluminum, gold, a metal alloy, ceramic or silicide, or another conductive material. Additionally, while not shown, connecting wiring may be provided in one or more additional metallization layers on the backside of the substrate 506 or insulator layer to connect the compensation electrodes 218A, 218B, RF electrodes 504, RF ground electrodes 507 and confinement or shuttling electrodes 210 to each other or to other elements, such as compensation switches, controllers, DACs, or the like. In some embodiments, an RF signal may be applied to the RF electrodes 504 by an RF generation system (not shown) and RF ground electrodes 507. However, in some embodiments, the compensation electrodes 218A, 218B and shuttling electrodes 210 may act as RF ground electrodes in place of, or in addition to, a discrete RF ground electrode 507. The RF signal on the RF electrodes 504 creates an RF field to trap the ion 502 in a desired position. Compensation voltages applied to the compensation electrodes 218A, 218B shift the ion 502 laterally along the compensation direction 508 by generating different individual compensation fields in component compensation directions 510A, 510B. Each compensation electrode 218A, 218B generates a component compensation field in a respective component compensation direction 510A, 510B to adjust the positioning of the ion 502 along a plane of the compensation direction 508, which is perpendicular to a movement direction 520. For example, a first compensation electrode 218A generates a field that attempts to adjust the ion 502 along a first component compensation direction 510A, while a second compensation electrode 218A, which is at a different angle to the ion than the first compensation electrode 218A, generates a second field that attempts to move the ion 502 along a second component compensation direction 510B. A higher voltage on one of the respective compensation electrode 218A, 218B will push the ion 502 away from the respective compensation electrode 218A, 218B, and a lower voltage will pull the ion 502 closer. The net adjustment or movement of the ion 502 can therefore be made along the plane of the compensation direction 508 by adjusting a difference in the voltages of the compensation electrodes 218A, 218B.

The E-field profile illustrates two E-fields 512, 514, with a first E-field generated as a result of applying a first compensation voltage to a first compensation electrode 218A. A second, smaller E-field is generated as a result of applying a second compensation voltage smaller than the first compensation voltage. The overlapping E-fields 512, 514 form a compensation trapping point 516. The ion 502 tends to shift along the compensation direction to reach the compensation trapping point 516, and thus, adjusting the difference between the first and second compensation voltages changes the relationship of the first and second E-field 512, 514, moving the compensation trapping point 516 and shifting the ion position along the plane of the compensation direction 508.

FIG. 5B is an isometric view illustrating a 2D ion shuttling system with outer compensation electrodes 218A, 218B according to some embodiments. FIG. 5C is a top view illustrating a 2D ion shuttling system with outer compensation electrodes 218A, 218B according to some embodiments. While the RF field provided by the RF electrodes 504 traps the ion 502, applying varying voltage profiles to the shuttling electrodes 210 shuttles the ion 502 along the movement direction 520. Applying compensation voltages to the compensation electrodes 218A, 218B shifts the ion along a plane of the compensation direction 508, with the compensation direction 508 plane being perpendicular to the movement direction 520.

In some embodiments, compensation electrodes 218A, 218B, RF electrodes 504, RF ground electrodes 507 and confinement or shuttling electrodes 210 may all be formed in a single substrate 506, with faces that are substantially coplanar, or at least exposed at a same side or face of the substrate 506, as shown in FIG. 5A. Additionally, the system 500 may have a pair of RF electrodes 504 with the RF ground electrode 507 disposed between the RF electrodes 504. The shuttling electrodes 210 may be disposed outside of the RF electrodes 504. In some embodiments, the shuttling electrodes may be segmented so that the RF electrodes 504 and RF ground electrode 507 expend past multiple shuttling electrodes 210, permitting increased precision of shuttling control. Additionally, the shuttling electrodes may be disposed along both sides of the RF electrodes 504 so that the shuttling electrodes may be used in p[airs to provide an DC shuttling field from both sides of the RF electrodes 504 for more uniform ion movement. Similarly, the compensation electrode 218A, 218B may be segmented so that the RF electrodes 504 and RF ground electrode 507 expend past multiple compensation electrodes 218A, 218B. Additionally, the compensation electrode s 218A, 218B may be arranged so that each compensation electrode 218A, 218B or pair of compensation electrodes 218A, 218B are associated with a shuttling electrode 210 or shuttling electrode pair or set. For example, pair of shuttling electrodes 210 may be arranged so that a first shuttling electrode is on each side the of RF electrodes 504, and a second shuttling electrode is on an opposite side of the RF electrodes 504. A pair of compensation electrodes 218A, 218B may be associated with the pair of shuttling electrodes 210, with a first compensation electrode aligned with, and disposed adjacent to the first shuttling electrode 210, and the second compensation electrode 218B, aligned with and disposed adjacent to, the second shuttling electrode 210.

Notably, while the system 500 is illustrated with a pair of compensation electrodes 218A, 218B associated with a particular shuttling electrode 210 or pair of shutting electrodes, one or more sets of compensation electrodes 218A, 218B, may be associated with a single shuttling electrode 210 or a pair of shuttling electrodes 210. Alternatively, multiple compensation electrodes on each side of the ion 502 or shuttling lane may form a compensation electrode set permitting finer control or adjustment of ion positioning. Additionally, the use of a pair, or set of compensation electrodes on opposite sides of the shuttling electrode, or on opposite sides of an ion movement path, allows adjustment of the in position in two dimensions perpendicular to the movement direction 520.

Figure 5D:
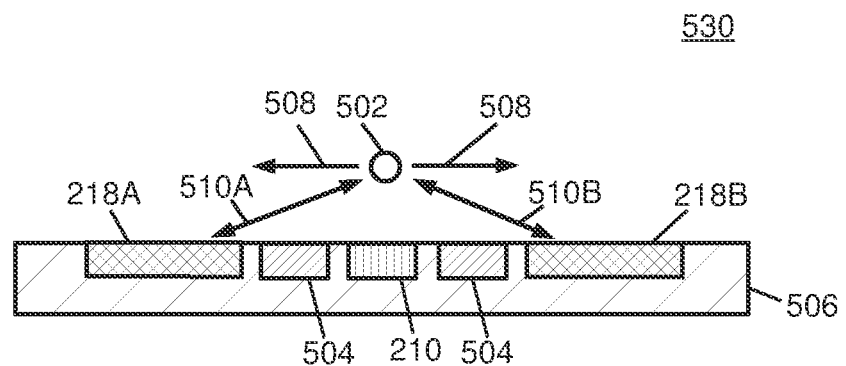
FIGS. 5D-5E are diagrams illustrating a 2D ion shuttling system with compensation electrodes and inner shuttling electrodes according to some embodiments.
Figure 5E:
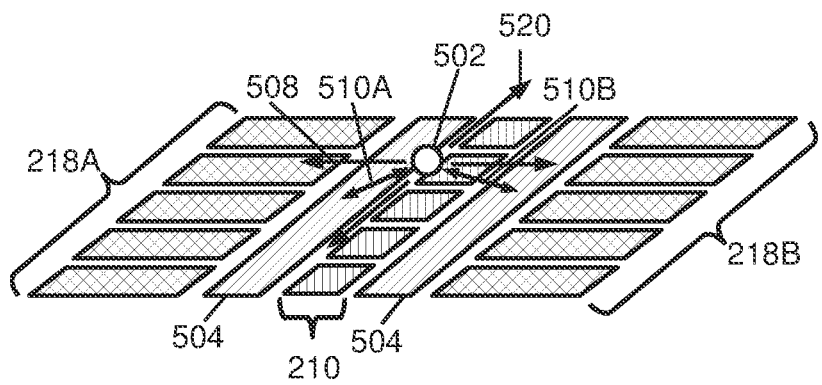

FIGS. 5D-5E are diagrams illustrating a 2D ion shuttling system 530 with compensation electrodes 218A, 218B and inner shuttling electrodes 210 according to some embodiments. FIG. 5D is a diagram illustrating a cutaway or side view of the 2D ion shuttling system 530 with compensation electrodes 218A, 218B and inner shuttling electrodes 210 according to some embodiments, and FIG. 5E is an isometric view of the 2D ion shuttling system 530 with compensation electrodes 218A, 218B and inner shuttling electrodes 210 according to some embodiments. In some embodiments, the system 530 may have compensation electrodes 218A, 218B, RF electrodes 504, and confinement or shuttling electrodes 210 formed in a single substrate 506, with faces that are substantially coplanar, or at least exposed at a same side or face of the substrate 506, as shown in FIG. 5D. The shuttling electrode 210 may act as RF ground electrodes, and may be disposed between the RF electrodes 504. Compensation electrodes 518A, 518B may be disposed outside of the RF electrodes 504, and a pair of compensation electrodes 518A, 518B may be associated with each shuttling electrode.

Figure 6A:
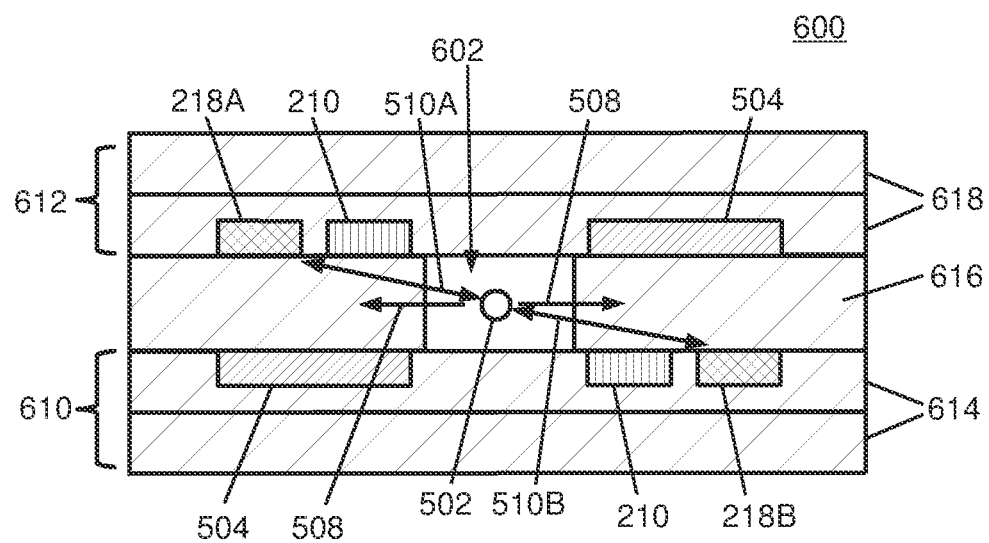
FIGS. 6A-6C are diagrams illustrating a three-dimensional (3D) ion shuttling system with segmented traps and compensation electrodes according to some embodiments.
Figure 6A:
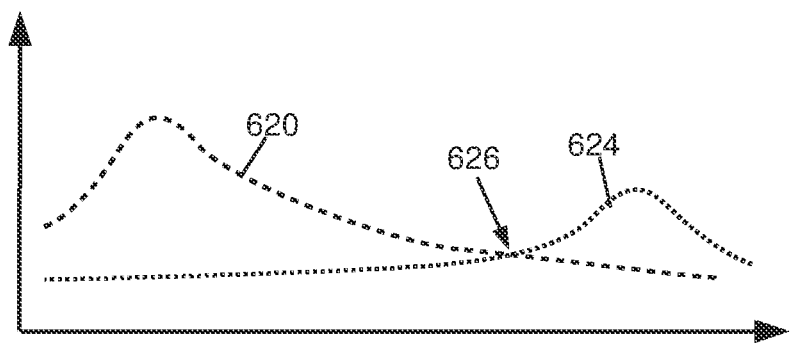
Figure 6B:
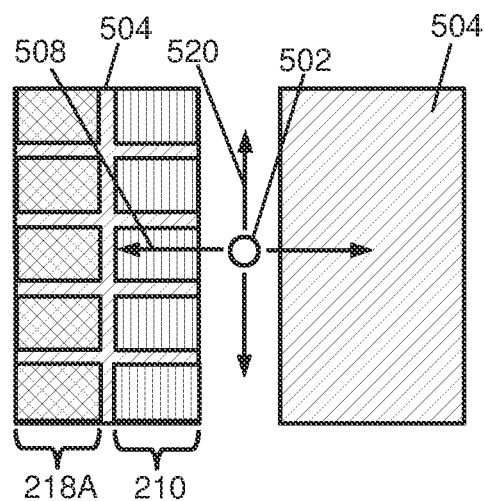
Figure 6C:
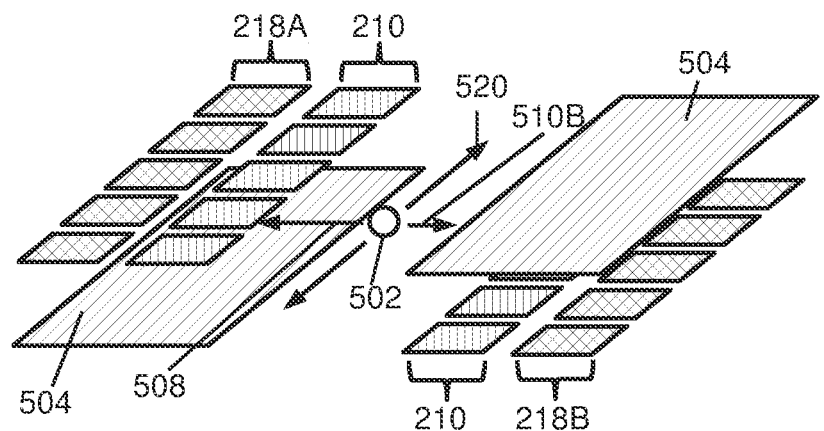

FIGS. 6A-6C are diagrams illustrating a three-dimensional (3D) ion shuttling system 600 with segmented traps and compensation electrodes according to some embodiments. FIG. 6A is a diagram illustrating a cutaway view of a 3D ion shuttling system 600 with compensation electrodes 218A, 218B and an E-field profile in a compensation direction 508. The 3D ion shuttling system 600 may be formed using two chips 610, 612, metal stack structures, interposers, or the like. The chips 610, 612 may be similar to, or formed similarly to, the 2D ion shuttling structure. The chips 610, 612 are spaced apart by a spacer layer 616 that forms a shuttling tunnel 602. In some embodiments, the spacer layer 616 is part of the first chip 610 or second chip, and has a groove or other opening so that, when the first and second chips are bonded, the groove in the spacer layer 616 forms the shuttling tunnel 602.

In the 3D ion shuttling system 600, the chips 610, 612 may have a metal stack with a plurality of substrate 614, 618, such as insulator layers with metal features formed therein. In some embodiments, a first chip 610 and a second chip 612 each have an RF electrode 504, compensation electrodes 21A, 218B, and shuttling electrodes 210 in one of the substrates 614, insulating layers or metallization layers. The shuttling electrodes 210 and compensation electrodes 218A, 218B may act as RF ground electrodes for the RF electrodes 504. Thus, both the first chip 610 and the second chip 612 may have circuitry and features for providing the RF field, shuttling voltages and compensation fields, with an RF electrode 504 opposite a space for the shuttling tunnel 602 from the respective shuttling electrodes 210 and compensation electrodes 518A, 518B on the same chip 610, 612. In some embodiments, the layout of the electrodes in the first and second chip may be substantially the same, so that, when a first chip 610 is mounted on a second chip 612, the electrode arrangements are mirror images, with a first RF electrode 504 in the first chip 610 opposite the shuttling tunnel 602 from a second RF electrode 605 in the second chip. Similarly, the second compensation electrode 518B and shuttling electrodes 210 in the first chip 610 are opposite the shuttling tunnel 620 from the first compensation electrode 518A and shuttling electrodes 210 of the second chip 612.

The E-field profile illustrates two E-fields 620, 624, with a first E-field 620 generated as a result of applying a first compensation voltage to a first compensation electrode 218A. A second, smaller E-field 624 is generated as a result of applying a second compensation voltage smaller than the first compensation voltage. The overlapping E-fields 620, 624 form a compensation trapping point 626. The ion 502 tends to shift along the compensation direction to reach the compensation trapping point 626, and thus, adjusting the difference between the first and second compensation voltages change the relationship of the first and second E-field 620, 624, moving the compensation trapping point 626 and shifting the ion position. Notably, the RF field keeps the ion 502 positioned vertically in the shuttling tunnel 602 and between the chips 610, while the compensation voltage applied to the compensation electrodes 218A, 218B generates the component compensation fields in the component compensation directions 510A, 510B resulting in a shift of the ion position in a plane of the compensation direction 508 substantially perpendicular to the movement direction 520.

FIG. 6B is an isometric view illustrating a 3D ion shuttling system with compensation electrodes 218A, 218B according to some embodiments. FIG. 6C is a top view illustrating a 3D ion shuttling system with compensation electrodes 218A, 218B according to some embodiments. Since the RF system provides a uniform RF field, the RF electrodes 501 may extend for any distance, while the shuttling electrodes 210 and compensation electrodes 218A, 218B are substantially shorter than the RF electrodes 504 and RF ground electrodes 507, allowing the shuttling electrodes 210 to provide different shuttling voltage E-fields in different regions. Similar to the 2D system, the RF field provided by the RF electrodes 504 traps the ion 502, and applying varying voltage profiles to the shuttling electrodes 210 shuttles the ion 502 along the movement direction 520. Applying compensation voltages to the compensation electrodes 218A, 218B shifts the ion along a plane of the compensation direction 508.

Figure 6D:
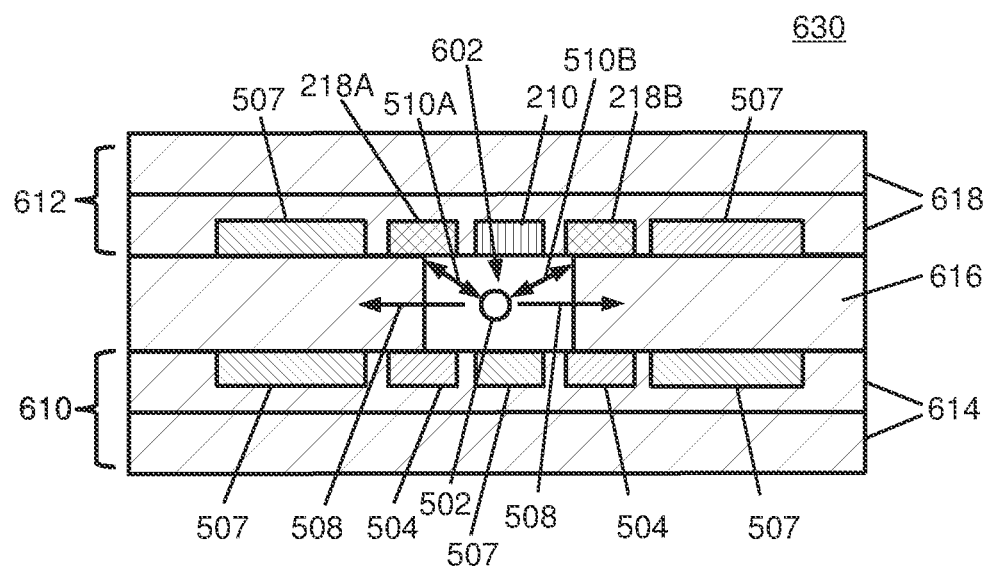
FIGS. 6D-6E are diagrams illustrating a 3D ion shuttling system with compensation electrodes according to some embodiments.
Figure 6E:
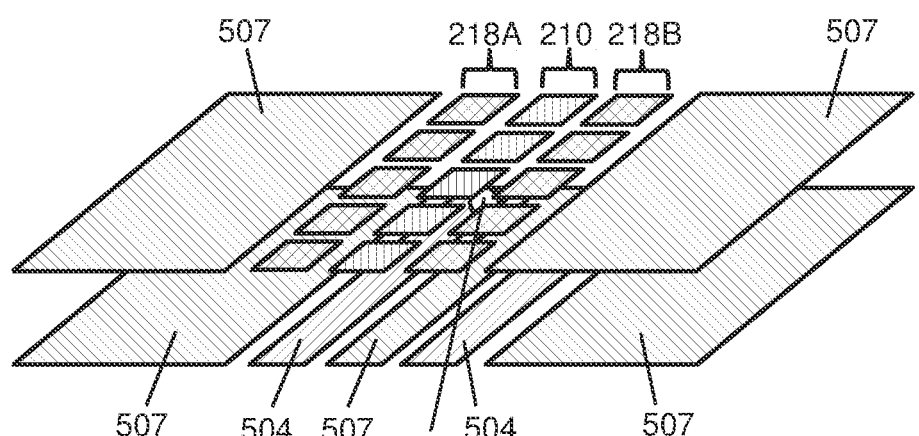

FIGS. 6D-6E are diagrams illustrating a 3D ion shuttling system 630 with compensation electrodes 518A, 518B according to some embodiments. FIG. 6D is a diagram illustrating a cutaway or side view of the 3D ion shuttling system 630 with compensation electrodes 218A, 218B and inner shuttling electrodes 210 according to some embodiments, and FIG. 6E is an isometric view of the 3D ion shuttling system 630 with compensation electrodes 218A, 218B and inner shuttling electrodes 210 according to some embodiments.

In some embodiments, the 3D system 630 is formed from first and second chips 610, 612, which each have a metal stack with a substrate 614, 618 or insulator layer with metal features formed therein. In some embodiments, a first chip 610 has RF electrodes 504 and first RF ground electrode 507 between the RF electrode 504 in one of the substrates 614, insulating layers or metallization layers. Second RF ground electrodes 507 may be disposed outside of the RF electrodes 504 in the first chip 610. A second chip 612 may have shuttling electrodes 210 between first compensation electrodes 218A and second compensation electrodes 218B. The shuttling electrodes 210 and compensation electrodes 218A, 218B may be between third RF ground electrodes 507 that are also disposed in the second chip 612. Thus, the first chip 610 may primarily have circuitry and features of the RF electrodes 504 and RF ground electrodes 507 for providing the RF field, and the second chip 612 may have circuitry and features for providing the shuttling and compensation.

The compensation voltage applied to the compensation electrodes 218A, 218B generates the component compensation fields in the component compensation directions 510A, 510B resulting in a shift of the ion position in a plane of the compensation direction 508 substantially perpendicular to the movement direction 520. This permits adjustment of the ion positioning while the RF field keeps the ion 502 positioned vertically in the shuttling tunnel 602 and between the chips 610, 612.

The RF electrodes 501 and RF ground electrodes 507 may extend for any distance, while the shuttling electrodes 210 and compensation electrodes 218A, 218B are substantially shorter than the RF electrodes 504 and RF ground electrodes 507, and are directly across the shuttling tunnel 602 from the RF electrodes 504. The RF field provided by the RF electrodes 504 traps the ion 502, and applying varying voltage profiles to the shuttling electrodes 210 shuttles the ion 502 along the movement direction 520. Applying compensation voltages to the compensation electrodes 218A, 218B shifts the ion laterally along the plane of compensation direction 508. In some embodiments, each shuttling electrode 210 may be associated with one or more compensation electrodes 518A, 581B. For example, each shuttling electrode may be associated with a compensation electrode pair 518A, 518B, with a first electrode on one side of the respective shuttling electrode 210, and a second compensation electrode 518B disposed on an opposite side of the shuttling electrode 210.

Figure 7:
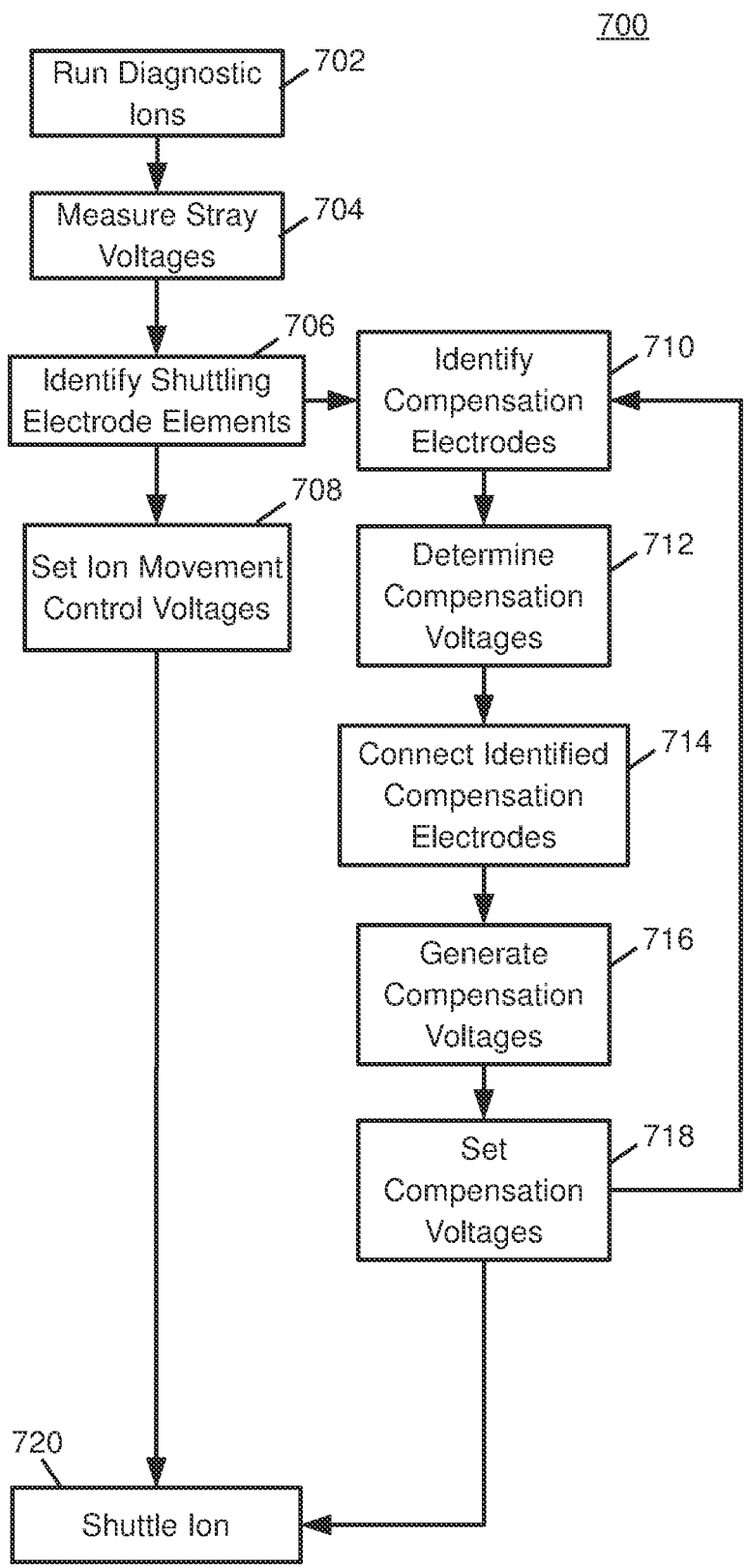
FIG. 7 is a flow diagram illustrating a method for providing stray voltage compensation for ion shuttling according to some embodiments.

FIG. 7 is a flow diagram illustrating a method 700 for providing stray voltage compensation for ion shuttling according to some embodiments. In block 702, one or more diagnostic ions are run through an ion shuttling system. This may include running ions through the without regard for the use or viability of the ions, as the diagnostic permits measurement of ion movement heating, and the like. In block 704, stray voltages are measured. The stray voltages may be determined from the measured micromotion, heating, or other properties of the diagnostic ions. Measuring the stray voltages permits the system to determine whether compensation voltages are needed for each shuttling ion, and the magnitude and direction of any compensation.

When an ion is to be shuttled, shuttling electrode elements are identified in block 706. The shuttling electrodes may be associated with a current position of an ion, and the intended or desired direction of motion. Thus, the shuttling electrodes may be the shuttling electrodes nearest the ion. In block 708, ion movement control voltages, such as shuttling and keeping voltages, are set. In some embodiments, keeping voltages may be provided without any compensation voltage, as there would be no ion for which lateral position compensation would be needed. For the identified shuttling electrodes, shuttling voltages may be applied to provide the E-field for the voltage profile needed to effectively shuttle an ion in the movement direction, or to hold an ion in a fixed position.

In block 710, compensation electrodes are identified. The compensation electrodes may be associated with electrodes identified as shuttling electrodes. For example, compensation electrodes may be electrode pairs that have a shuttling electrode between, or immediately between, electrodes of the electrode pair such that the compensation electrodes associated with a particular shuttling electrode are the compensation electrodes nearest the respective shuttling electrode.

In block 712, one or more compensation voltages are determined. The compensation voltages may be determined according to the stray voltage measurements taken from running of the diagnostic ions, but may also be determined according to previous ion shuttling processes, determined according to projected stray voltages calculated according to the geometry or physical characteristics of the ion shuttling system, according to stray voltages during use of a particular electrode or DAC, or according to another property, measurement or observation.

In block 714, the identified compensation voltages are connected to a DAC or other voltage source. In some embodiments, the identified compensation electrodes are electrodes that should be serviced by a DAC providing the relevant voltage. For example, for some shuttling electrodes, first electrodes of one or more compensation electrode pairs may need a +8 v compensation voltage, and the second electrodes may need +5 v compensation voltage. For other shuttling electrodes, first electrodes of other compensation electrode pairs may need a +6 v compensation voltage, and the second electrodes of the other compensation electrode pairs may need +4 v. The system may identify compensation electrodes needing a same or similar compensation voltage, and connect all of those electrodes to the same DAC by closing switches associated with the relevant compensation electrodes.

In block 716, compensation voltages are generated. In some embodiments, a voltage source, such as a DAC, that has been connected to one or more if the identified compensation electrodes, is sent a signal, such as a digital signal, indicating the relevant compensation voltage, and generates an analog voltage according to the digital signal, or according to another control signal.

In block 718, the compensate voltages are set. In some embodiments, a capacitor associated with a compensation electrode is charged by the compensation voltage provided by the connected voltage source. Once charged, the connected compensation electrodes may be disconnected from the voltage source, and the process of setting the compensation voltages may be repeated, or the compensation electrodes may be discharged, or have their voltage or charge refreshed or maintained.

In block 720, the ion may be shuttled. In some embodiments, the ion is shuttled along a movement direction as a result of being subjected to a voltage or E-field gradient created by the shuttling voltages, and may be laterally adjusted as a result of being subjected to the E-field created by the compensation voltages.

An embodiment apparatus includes a plurality of first electrodes connected to a system configured to selectively provide an ion movement control voltage to each electrode of the plurality of first electrodes, a voltage source configured to provide one or more compensation voltages, a plurality of compensation electrodes comprising a plurality of compensation electrode pairs, wherein each compensation electrode pair of the plurality of compensation electrode pairs is associated with a one or more different first electrodes of the plurality of first electrodes, and a plurality of switches, wherein each switch of the plurality of switches is connected at a respective first node to a compensation electrode of the plurality of compensation electrodes and is configured to selectively connect the respective compensation electrode to the voltage source.

In some embodiments, the apparatus further comprises a plurality of capacitors, wherein each capacitor of the plurality of capacitors is associated with an electrode of the plurality of compensation electrodes and is connected at a first end to the first node to which the respective compensation electrode is connected, and wherein a second end of the capacitor is connected to a reference voltage. In some embodiments, the compensation electrode is a first compensation electrode of a compensation electrode pair of the plurality of compensation electrode pairs, and the first compensation electrode and a second compensation electrode of the compensation electrode pair are disposed on opposite sides of the associated one or more first electrodes. In some embodiments, the apparatus further comprises a compensation controller connected to the plurality of switches and to the voltage source. In some embodiments, the apparatus further comprises one or more radio frequency (RF) electrodes connected to an RF system. In some embodiments, the plurality of first electrodes, the plurality of compensation electrodes and the one or more RF electrodes are disposed in a same chip. In some embodiments, a first RF electrode of the one or more RF electrodes extends between the plurality of first electrodes and first compensation electrodes of the plurality of compensation electrode pairs, a second RF electrode of the one or more RF electrodes extends between the plurality of first electrodes and second compensation electrodes of the plurality of electrode pairs, and wherein the plurality of first electrodes is disposed between the first RF electrode and the second RF electrode. In some embodiments, the plurality of first electrodes and the plurality of compensation electrodes are disposed in a first chip, and the one or more RF electrodes are disposed in a second chip mounted to the first chip. In some embodiments, the apparatus further comprises one or more first RF ground electrodes disposed in the first chip, and one or more second RF ground electrodes disposed in the second chip.

An embodiment apparatus includes one or more radio frequency (RF) electrodes connected to an RF generation system and configured to create an RF trapping point and to trap an ion, a plurality of first electrodes configured to control movement of an ion along a movement direction by generating an electrical field as a result of being provided with an ion movement control voltage, a voltage source configured to provide one or more compensation voltages, a plurality of compensation electrodes comprising a plurality of compensation electrode pairs, wherein each compensation electrode pair of the plurality of compensation electrode pairs is associated with one or more different first electrodes that are of the plurality of first electrodes and that is disposed between compensation electrodes of the associated compensation electrode pair, wherein each compensation electrode pair is configured to provide a compensation electrical field (E-Field) to an ion being shuttled by one or more associated first electrodes to shift an ion, which is affected by a stray voltage, toward the RF trapping point in response to compensation voltages provided to the compensation electrodes of the compensation electrode pair, a plurality of switches, wherein each switch of the plurality of switches is configured to selectively connect a respective compensation electrode of the plurality of compensation electrodes to the voltage source.

In some embodiments, the apparatus further comprises a plurality of capacitors, wherein each capacitor of the plurality of capacitors is associated with, and connected to, an electrode of the plurality of compensation electrodes, and a respective switch of the plurality of switches is configured to connect a respective capacitor to the voltage source such that the respective capacitor is charged to a first compensation voltage in response to a compensation voltage being provided by the voltage source, and such that the respective capacitor remains charged after the respective switch disconnects the respective capacitor from the voltage source. In some embodiments, the apparatus further comprises a compensation controller configured to identify a compensation electrode of the plurality of compensation electrodes, and to send one or more signals to the plurality of switches that cause a switch of the plurality of switches to connect the compensation electrode to the voltage source. In some embodiments, the compensation controller is further configured to identify two or more compensation electrodes of the plurality of compensation electrodes, and to send one or more signals to the plurality of switches that cause two or more switches of the plurality of switches to simultaneously connect the two or more compensation electrodes to the voltage source. In some embodiments, the compensation controller is further configured to determine a first compensation voltage for the compensation electrode, and send a signal to the voltage source causing the voltage source to provide the first compensation voltage to the compensation electrode. In some embodiments, the compensation electrode is a first compensation electrode of a compensation electrode pair of the plurality of compensation electrode pairs, and the first compensation electrode and a second compensation electrode of the compensation electrode pair are disposed on opposite sides of the one or more associated first electrodes, and the compensation controller is further configured to determine a second compensation voltage related to, and different from, the first compensation voltage, and to send a signal to the voltage source causing the voltage source to provide the second compensation voltage to the second compensation electrode.

An embodiment method for using an embodiments system includes identifying one or more compensation electrodes from a plurality of compensation electrodes in an ion movement control system having the plurality of compensation electrodes and a plurality of first electrodes, determining a compensation voltage for the one or more compensation electrodes, controlling a voltage source to provide the compensation voltage, and providing the compensation voltage to the one or more compensation electrodes by connecting the one or more compensation electrodes to the voltage source while a first electrode of the plurality of first electrodes controls movement an ion.

In some embodiments, providing the compensation voltage to the one or more compensation electrodes by connecting the one or more compensation electrodes to the voltage source comprises controlling one or more switches of a plurality of switches to connect the one or more compensation electrodes to the voltage source. In some embodiments, controlling the one or more switches of a plurality of switches to connect the one or more compensation electrodes to the voltage source comprises charging one or more electrodes associated with the one or more compensation electrodes. In some embodiments, the one or more compensation electrodes comprises a first compensation electrode of a compensation electrode pair, and the first compensation electrode and a second compensation electrode of the compensation electrode pair are disposed on opposite sides of one or more associated first electrodes, and providing the compensation voltage to the one or more compensation electrodes by connecting the one or more compensation electrodes to the voltage source comprises providing a first compensation voltage to the first compensation electrode and providing a second compensation voltage related to, and different from, the first compensation voltage to the second compensation electrode. In some embodiments, providing the first compensation voltage to the first compensation electrode and providing a second compensation voltage to the second compensation electrode comprises providing a compensation electrical field (E-Field) to the ion during movement control an ion by one or more associated first electrodes to shift the ion, which is affected by a stray voltage, toward an RF trapping point of an RF field trapping the ion.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A voltage control system comprising:
   a controller, configured to:
   identify one or more compensation electrodes from a plurality of compensation electrodes of an ion movement control system;
   select one or more compensation voltages for the one or more compensation electrodes;
   control a voltage source to provide a first compensation voltage of the one or more compensation voltages; and
   control one or more switches of a plurality of switches to connect the one or more compensation electrodes to the voltage source.

2. The voltage control system of claim 1, wherein the one or more compensation electrodes comprise a first compensation electrode and a second compensation electrode of a compensation electrode pair;
   wherein selecting the one or more compensation voltages for the one or more compensation electrodes comprises selecting a first compensation voltage for the first compensation electrode and selecting a second compensation voltage for the second compensation electrode; and
   wherein controlling the one or more switches comprises controlling a first switch of the one or more switches to provide the first compensation voltage to the first compensation electrode and controlling a second switch of the one or more switches to provide the second compensation voltage to the second compensation electrode.

3. The voltage control system of claim 1, wherein the controller is further configured to:
   control a discharge circuit to discharge at least one control electrode of a plurality of control electrodes.

4. The voltage control system of claim 1, wherein the controller is further configured to periodically refresh a respective compensation voltage on each of the plurality of compensation electrodes.

5. The voltage control system of claim 1, wherein selecting the one or more compensation voltages for the one or more compensation electrodes comprises selecting a same compensation voltage for at least two compensation electrodes of the one or more compensation electrodes, and
   wherein controlling the one or more switches of the plurality of switches comprises controlling at least two switches of the plurality of switches to connect the at least two compensation electrodes to the same voltage source.

6. The voltage control system of claim 1, wherein the one or more compensation voltages are predetermined compensation voltages.

7. The voltage control system of claim 6, wherein the predetermined compensation voltages are determined according to stray voltage measurements associated with one or more diagnostic ions.

8. The voltage control system of claim 1, further comprising the one or more switches, the voltage source, and the plurality of compensation electrodes.

9. An apparatus, comprising:
   a plurality of first electrodes connected to a system configured to selectively provide an ion movement control voltage to each electrode of the plurality of first electrodes;
   a voltage source configured to provide one or more compensation voltages;
   a plurality of compensation electrodes comprising a plurality of compensation electrode pairs, wherein at least one first electrode of the plurality of first electrodes is associated with one or more compensation electrodes from one or more different compensation electrode pairs of the plurality of compensation electrodes; and
   a plurality of switches, wherein each switch of the plurality of switches is connected at a respective first node to a compensation electrode of the plurality of compensation electrodes and is configured to selectively connect the respective compensation electrode to the voltage source.

10. The apparatus of claim 9, further comprising:
    a plurality of capacitors, wherein each capacitor of the plurality of capacitors is associated with a compensation electrode of the plurality of compensation electrodes and is connected at a first end to the first node to which the respective compensation electrode is connected, and wherein a second end of the capacitor is connected to a reference voltage.

11. The apparatus of claim 9, wherein each first electrode has a first compensation electrode and a second compensation electrode of an associated compensation electrode pair of the plurality of compensation electrode pairs disposed on opposite sides of the respective first electrode.

12. The apparatus of claim 9, further comprising a compensation controller connected to the plurality of switches and to the voltage source.

13. The apparatus of claim 9, further comprising one or more radio frequency (RF) electrodes connected to an RF system.

14. The apparatus of claim 13, wherein the plurality of first electrodes, the plurality of compensation electrodes and the one or more RF electrodes are disposed in a same chip.

15. The apparatus of claim 14, wherein a first RF electrode of the one or more RF electrodes extends between the plurality of first electrodes and first compensation electrodes of the plurality of compensation electrode pairs, wherein a second RF electrode of the one or more RF electrodes extends between the plurality of first electrodes and second compensation electrodes of the plurality of compensation electrode pairs, and wherein the plurality of first electrodes is disposed between the first RF electrode and the second RF electrode.

16. The apparatus of claim 13, wherein the plurality of first electrodes and the plurality of compensation electrodes are disposed in a first chip, and the one or more RF electrodes are disposed in a second chip mounted to the first chip.

17. The apparatus of claim 16, further comprising one or more first RF ground electrodes disposed in the first chip, and one or more second RF ground electrodes disposed in the second chip.

18. An apparatus, comprising:
one or more radio frequency (RF) electrodes connected to an RF generation system and configured to create an RF trapping point and to trap an ion;
a plurality of first electrodes configured to control movement of an ion along a movement direction by generating an electrical field as a result of being provided with an ion movement control voltage;
a voltage source configured to provide one or more compensation voltages;
a plurality of compensation electrodes comprising a plurality of compensation electrode pairs, wherein at least one first electrode of the plurality of first electrodes is associated with one or more compensation electrodes from one or more different compensation electrode pairs of the plurality of compensation electrodes, wherein each compensation electrode pair is configured to provide a compensation electrical field (E-Field) to an ion being shuttled by an associated one or more first electrodes to shift an ion, which is affected by a stray voltage, toward the RF trapping point in response to compensation voltages provided to the compensation electrodes of the compensation electrode pair; and
a plurality of switches, wherein each switch of the plurality of switches is configured to selectively connect a respective compensation electrode of the plurality of compensation electrodes to the voltage source.

19. The apparatus of claim 18, further comprising a plurality of capacitors, wherein each capacitor of the plurality of capacitors is associated with, and connected to, an electrode of the plurality of compensation electrodes; and
wherein a respective switch of the plurality of switches is configured to connect a respective capacitor to the voltage source such that the respective capacitor is charged to a first compensation voltage in response to a compensation voltage being provided by the voltage source, and such that the respective capacitor remains charged after the respective switch disconnects the respective capacitor from the voltage source.

20. The apparatus of claim 18, further comprising a compensation controller configured to identify a compensation electrode of the plurality of compensation electrodes, and to send one or more signals to the plurality of switches that cause a switch of the plurality of switches to connect the compensation electrode to the voltage source.

21. The apparatus of claim 20, wherein the compensation controller is further configured to identify two or more compensation electrodes of the plurality of compensation electrodes, and to send one or more signals to the plurality of switches that cause two or more switches of the plurality of switches to simultaneously connect the two or more compensation electrodes to the voltage source.

22. The apparatus of claim 20, wherein the compensation controller is further configured to determine a first compensation voltage for the compensation electrode, and send a signal to the voltage source causing the voltage source to provide the first compensation voltage to the compensation electrode.

23. The apparatus of claim 22, wherein each first electrode has a first compensation electrode and a second compensation electrode of an associated compensation electrode pair of the plurality of compensation electrode pairs disposed on opposite sides of an associated first electrode; and
wherein the compensation controller is further configured to determine a second compensation voltage related to, and different from, the first compensation voltage, and to send a signal to the voltage source causing the voltage source to provide the second compensation voltage to the second compensation electrode.

* * * * *